(12) United States Patent
Karenowska et al.

(10) Patent No.: US 8,018,222 B2
(45) Date of Patent: Sep. 13, 2011

(54) ELECTROMAGNETIC FIELD-BASED POSITION SENSOR

(76) Inventors: Alexy Davison Karenowska, Nottinghamshire (GB); John Francis Gregg, Oxfordshire (GB)

( * ) Notice: Subject to any disclaimer, the term of this patent is extended or adjusted under 35 U.S.C. 154(b) by 438 days.

(21) Appl. No.: 12/280,908

(22) PCT Filed: Jan. 31, 2007

(86) PCT No.: PCT/GB2007/000350
§ 371 (c)(1),
(2), (4) Date: Sep. 23, 2008

(87) PCT Pub. No.: WO2007/099282
PCT Pub. Date: Sep. 7, 2007

(65) Prior Publication Data
US 2009/0091314 A1    Apr. 9, 2009

(30) Foreign Application Priority Data

Feb. 28, 2006    (GB) .................................. 0604039.8

(51) Int. Cl.
*G01B 7/14* (2006.01)
(52) U.S. Cl. .............................. 324/207.16; 324/207.24
(58) Field of Classification Search ........................ None
See application file for complete search history.

(56) References Cited

U.S. PATENT DOCUMENTS

| | | | |
|---|---|---|---|
| 4,112,365 A | 9/1978 | Larson et al. | 324/173 |
| 4,667,158 A | 5/1987 | Redlich | 324/207 |
| 4,866,378 A | 9/1989 | Redlich | 324/208 |
| 4,912,409 A * | 3/1990 | Redlich et al. | 324/207.13 |
| 5,210,490 A | 5/1993 | Munch et al. | 324/207.17 |
| 5,619,133 A | 4/1997 | Shank et al. | 324/207.24 |
| 6,191,575 B1 * | 2/2001 | Mednikov et al. | 324/207.16 |
| 6,323,641 B1 | 11/2001 | Allwine | |
| 6,512,360 B1 | 1/2003 | Goto et al. | 324/120 |

FOREIGN PATENT DOCUMENTS

| | | |
|---|---|---|
| DE | 3500121 | 7/1986 |
| EP | 0592849 | 4/1994 |
| EP | 1122520 | 8/2001 |
| EP | 1382938 | 1/2004 |
| GB | 1452132 | 10/1976 |
| GB | 2201788 | 9/1988 |

(Continued)

OTHER PUBLICATIONS

Examination Report dated Mar. 10, 2009, App. No. GB0604039.8, 3 pp.

(Continued)

*Primary Examiner* — Minh N Tang
(74) *Attorney, Agent, or Firm* — Sunstein Kann Murphy & Timbers LLP

(57) ABSTRACT

There is described a position sensor comprising a sensor electromagnetic field generator, a screen arranged to confine the sensor electromagnetic field, and an output. The output is arranged to provide a signal which varies in dependence upon an amount of flux compression of the electromagnetic field resulting from the presence of the screen. The amount of flux compression is related to a position of the screen in relation to the sensor electromagnetic field generator. There is also described a method of detecting a relative position of an electromagnetic field generator and a screen.

18 Claims, 20 Drawing Sheets

FOREIGN PATENT DOCUMENTS

| | | |
|---|---|---|
| GB | 2435518 | 11/2009 |
| JP | 1096511 | 4/1989 |
| WO | WO 01/69168 | 9/2001 |

OTHER PUBLICATIONS

Jo Pelly, Boult Wade Tennant, Response to Examination Report dated Aug. 4, 2009, App. No. GB0604039.8, 14 pp.

*Patents Act 1977: Search Report under Section 17* for GB Patent Application No. GB0604039.8, Jun. 21, 2006, 2 pages.

Authorized Officer Sibylle Schubert-Puschel, *International Search Report and Written Opinion of the International Searching Authority*, International Searching Authority, International Application No. PCT/GB2007/000350, Aug. 9, 2007, 6 pages.

Authorized Officer Mark Stobbelaar, *Written Opinion of the International Searching Authority*, International Application No. PCT/GB2007/000350, 6 pages.

European Patent Office, English language abstract of JP1096511 from EPODOC/EPO, dated Jun. 21, 2006, 1 page.

European Patent Office, English language abstract of DE3500121 from EPODOC/EPO, dated Aug. 27, 2008, 1 page.

Authorized Officer Dorothée Mülhausen, *International Preliminary Report on Patentability*, International application No. PCT/GB2007/000350, 7 pages, Sep. 2, 2008.

\* cited by examiner

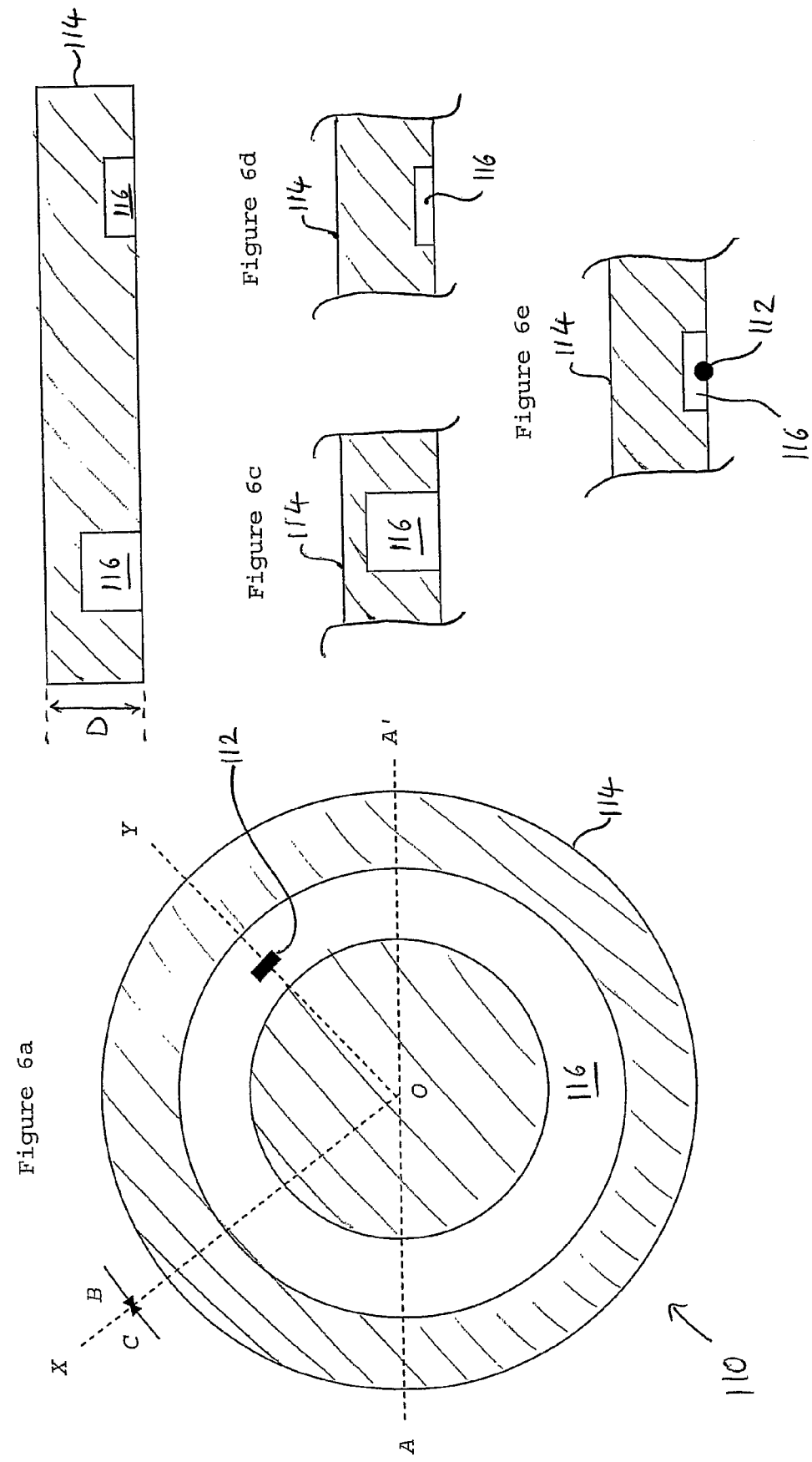

ELECTROMAGNETIC FIELD-BASED POSITION SENSOR

CROSS-REFERENCE TO RELATED APPLICATIONS

This application is a U.S. National Phase, and therefore claims priority from, PCT/GB2007/000350 having an international filing date of Jan. 31, 2007, which in turn claims priority from GB 0604039.8 filed Feb. 28, 2006, each of which is hereby incorporated herein by reference in its entirety.

FIELD OF THE INVENTION

The present invention relates to a position sensor for detecting linear and/or angular position, and to a method of position sensing.

BACKGROUND OF THE INVENTION

Many types of position sensors are currently available for detecting linear and/or angular position. For high resolution position detection, conventional variable capacitance sensors may be used. Alternatively, linear variable transformers may be used, but these are generally expensive and bulky. Moreover, the associated temperature compensation of these prior art sensors can be difficult. In addition, such sensors are rendered useless by the presence of oil or cutting fluid on their active surfaces, and will not work when immersed in fluid.

SUMMARY OF THE INVENTION

Against this background there is provided, in accordance with a first aspect of the present invention, a position sensor comprising a sensor electromagnetic field generator, a screen arranged to confine the sensor electromagnetic field, and an output arranged to provide a signal which varies in dependence upon an amount of flux compression of the electromagnetic field by the screen, the amount of flux compression being related to a position of the screen in relation to the sensor electromagnetic field generator.

In a preferred embodiment, the sensor electromagnetic field generator comprises a coil and a capacitive element which together form a resonant circuit. Thus, a change in position of the screen in relation to the coil translates into a change in flux compression of the coil's electromagnetic field by the screen, and an associated change in the inductance of the coil. This in turn alters the impedance of the circuit, which may be measured by bridge techniques, or by observing a change in the resonant frequency or the quality factor of the circuit, for example.

Thus, there is provided an accurate position sensor for sensing linear or angular position. A position sensor according to the present invention has a number of advantages over previous sensors, as described below.

The present position sensor is more robust than previous sensors and is not vulnerable to failure or malfunction due to ingress of dust or oil. The present sensor is invulnerable to D.C. drift, and experiences none of the problems usually introduced by 1/f noise. In addition, the present sensor is compact, as well as being inexpensive and easy to manufacture. The present sensor can operate whilst immersed in fluid, or at high temperatures, and is generally tolerant of hostile environments. Higher spatial resolution is possible with the present position sensor than with prior art sensors. Furthermore, the present sensor is insensitive to system wear, bearing wear, and the effects of mechanical vibration. The active life of the present sensor is expected to exceed that of a variable capacitance sensor. The length of the present sensing device is less than the required length of a linearly variable transformer for a given measuring range and resolution. Moreover, the present sensor is easily temperature compensated and is therefore ideally suited to non-thermostatic applications.

Preferably, the output of the position sensor is arranged to provide a signal that varies in dependence upon a resonant frequency of the resonant circuit, the resonant frequency being related to the flux compression of the electromagnetic field by the screen.

In a preferred embodiment, there is provided a linear position sensor in which the screen comprises a tubular screen adapted to coaxially receive the coil, and the tubular screen is movable in an axial direction relative to the coil. Preferably, the tubular screen is tapered. More preferably, the tapering is such that the resonant frequency is linearly related to the axial position of the coil within the tubular screen.

In another preferred embodiment, the tubular screen is a first cylindrical screen and the sensor further comprises a metallic outer cylindrical screen disposed coaxially around the first cylindrical screen and the coil. The outer cylindrical screen is fixed in an axial direction with respect to the coil, whereas the first cylindrical screen can move in an axial direction in a space between the coil and the outer cylindrical screen. In this way, the resonant frequency of the resonant circuit is monotonically related to the axial position of the first cylindrical screen relative to the coil and the outer cylindrical screen. The sensor is insensitive to sideways displacement of the first screen and thus to system vibration, eccentricity, bearing wear, etc.

In a further preferred embodiment, there is provided a linear position sensor in which the screen comprises an outer screen adapted to receive the coil, and a long tapered part, such as a wire or rod, disposed axially through the coil. The long tapered part is moveable in an axial direction relative to the coil such that the flux compression is related to the axial position of the long tapered part relative to the coil. The sensor is insensitive to sideways movement of the long tapered part and thus should give an output proportional to the diameter of the long tapered part without the need for precise centring. In this way, the sensor is insensitive to machining error, and mechanical wear, etc.

In an alternative embodiment, there is provided an angular position sensor in which the screen comprises a spiral recess of varying dimension. The coil is located at least partially within the recess, and is movable within the recess such that a longitudinal axis of the coil remains tangential to a spiral path at the centre of the recess.

In another embodiment, the screen comprises an annular recess having a depth that varies with angular position around the recess. The coil is at least partially received within the recess, and is movable within the recess such that a longitudinal axis of the coil remains tangential to a circular path at the centre of the recess.

In a further embodiment, the screen comprises an outer screen and a metallic part. The outer screen encloses the metallic part and the coil, and the flux compression is related to a rotational position of the metallic part.

In yet another embodiment, the screen comprises an outer screen adapted to receive the coil and an annular tapered part disposed through the coil. The annular tapered part is rotatable such that the flux compression is related to a rotational position of the annular tapered part relative to the coil.

In an alternative embodiment, the position sensor further comprises: a second sensor electromagnetic field generator, the screen being further arranged to confine the second sensor electromagnetic field; and a second output arranged to provide a second signal which varies in dependence upon an amount of flux compression of the second electromagnetic field resulting from the presence of the screen, the amount of flux compression of the second electromagnetic field being related to a position of the screen in relation to the second sensor electromagnetic field generator. Thus, a degree of redundancy is provided in the sensor.

According to a second aspect of the present invention, there is provided a method of detecting a relative position of an electromagnetic field generator and a screen, comprising (a) generating an electromagnetic field using the electromagnetic field generator, (b) confining the electromagnetic field using the screen, and (c) detecting a flux compression of the electromagnetic field resulting from the presence of the screen, the amount of flux compression being related to a position of the screen in relation to the electromagnetic field generator.

Other preferred features of the invention are set out in the appended claims.

BRIEF DESCRIPTION OF THE DRAWINGS

Some embodiments of the present invention will now be described by way of example with reference to the accompanying drawings in which:

FIG. 1a is an end view of the inductor and screen, and FIG. 1b is a longitudinal cross section of the inductor and screen;

FIG. 2 is a linear position sensor according to one embodiment of the present invention, in which

FIG. 6 is an angular position sensor according to a further embodiment of the present invention, in which FIG. 6a is a horizontal section, FIG. 6b is a vertical section along AA', FIGS. 6c and 6d are vertical sections along OX viewed in directions B and C respectively, and FIG. 6e is a vertical section along OY;

DETAILED DESCRIPTION OF A PREFERRED EMBODIMENT

In order to provide a better understanding of the invention, the theory underlying it will first be set out, following which some embodiments of practical devices operating in accordance with that theory will be described.

Figure 1B:
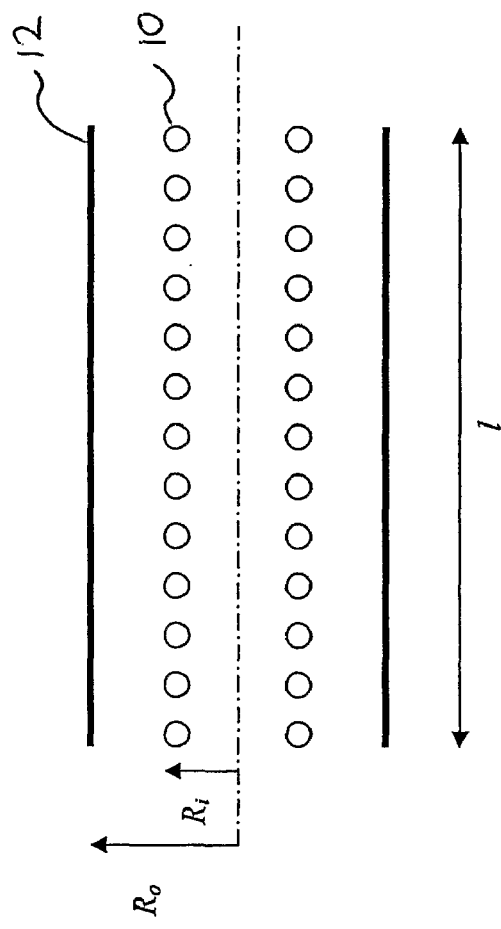
FIGS. 1a and 1b show an inductor and a metallic screen according to one embodiment of the present invention.
Figure 1A:
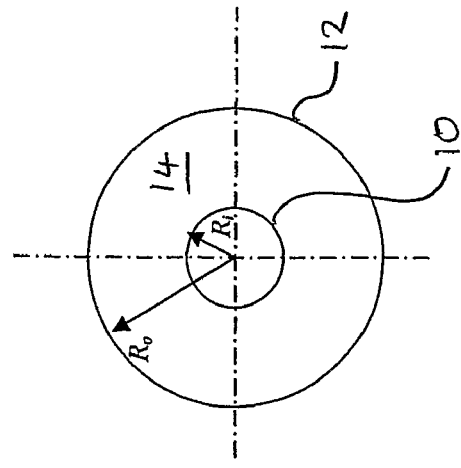

With this in mind, FIGS. 1a and 1b show an inductor 10 having n turns, length l and radius $R_i$ within a cylindrical metallic screen 12 of radius $R_o$.

It will first be shown that there is negligible penetration of the metallic screen 12 by a time-varying electromagnetic field. A parallel tuned circuit comprising the inductor 10 and a capacitor of capacitance C will then be described. In particular, it will be shown that a change in position of the screen 12 in relation to the inductor 10 may be detected in various ways using the tuned circuit.

Theory

The depth to which a time-varying electromagnetic field will penetrate a conductor is dependent upon the frequency w of the applied field. A conductor in the presence of an electric or magnetic field can be shown to have an internal field distribution that decays exponentially with distance from its surface and has decayed to 1/e of its original value at the skin depth δ. As shown in the derivation that follows, δ decreases with increasing ω and is small in materials of high electrical conductivity and high magnetic permeability; thus, at high frequency, metals behave to a close approximation as diamagnets (i.e. effectively as magnetic flux mirrors).

Beginning at Maxwell's Equations:

$$\nabla \wedge H = J + \frac{\partial D}{\partial t} \tag{1}$$

$$\nabla \wedge E = -\frac{\partial B}{\partial t} \tag{2}$$

Substituting J=σE and D=εE into Equation (1):

$$\nabla \wedge H = \sigma E + \varepsilon \frac{\partial E}{\partial t} \tag{3}$$

Substituting B=μH into Equation (2):

$$\nabla \wedge E = -\mu \frac{\partial H}{\partial t} \tag{4}$$

Taking the curl of Equation (4):

$$\nabla \wedge \nabla \wedge E = -\mu \frac{\partial (\nabla \wedge H)}{\partial t} \tag{5}$$

Substituting from Equation (3):

$$\nabla \wedge \nabla \wedge E = -\mu \left( \sigma \frac{\partial E}{\partial t} + \varepsilon \frac{\partial^2 E}{\partial t^2} \right) \tag{6}$$

Expanding the left hand side, and noting that since the divergence of Equation (1) is zero, ∇·E=0, we find that:

$$\nabla \wedge \nabla \wedge E = \nabla(\nabla \cdot E) - \nabla^2 E = -\nabla^2 E \tag{7}$$

Substituting into Equation (6):

$$-\nabla^2 E = -\mu\left(\sigma\frac{\partial E}{\partial t} + \varepsilon\frac{\partial^2 E}{\partial t^2}\right) \quad (8)$$

Let:

$$E = E_0 e^{j(\omega t - kx)}$$

where x is the distance into the conductor, perpendicular to its surface. Substituting Equation (9) into Equation (8):

$$k^2 = \omega^2\mu\varepsilon - j\omega\mu\sigma \quad (10)$$

Hence:

$$k = \pm(\omega^2\mu\varepsilon - j\omega\mu\sigma)^{1/2} \quad (11)$$

In the case of a good conductor, the second term in the brackets of Equation (11) dominates so that:

$$k \cong \pm(-j\omega\mu\sigma)^{1/2} = \pm(1-j)\sqrt{\frac{\omega\mu\sigma}{2}} \quad (12)$$

Substituting Equation (12) into Equation (9):

$$E = E_0 e^{j\left(\omega t \pm (1-j)\sqrt{\frac{\omega\mu\sigma}{2}}x\right)} = E_0 e^{j\left(\omega t \pm \sqrt{\frac{\omega\mu\sigma}{2}}x\right)} e^{\sqrt{\frac{\omega\mu\sigma}{2}}x} \quad (13)$$

Now considering the magnetic case: from Equation (3), when σ is large, we find that:

$$\nabla\hat{}H \cong \sigma E \quad (14)$$

Taking the curl of Equation (17) and noting that ∇·B=0 and hence since μ is scalar, ∇·H=0

$$\nabla\hat{}\nabla\hat{}H = (\nabla\cdot H)\nabla - \nabla^2 H = -\nabla^2 H = \nabla\hat{}(\sigma E) \quad (15)$$

Expanding the right-hand side of Equation (15):

$$\nabla\hat{}(\sigma E) = \sigma(\nabla\hat{}E) + \nabla\sigma\hat{}E = \sigma(\nabla\hat{}E) \quad (16)$$

Substituting into Equation (15) from Equations (2) and (16), we have:

$$-\nabla^2 H = -\sigma\mu\frac{\partial H}{\partial t} \quad (17)$$

Now substituting a solution for H of the standard form:

$$H = H_0 e^{j(\omega t - kx)}$$

we find that $$H_0 k^2 = -j\omega\mu\sigma H_0 \quad (18)$$

Hence:

$$k = \pm(-j\omega\mu\sigma)^{1/2} \quad (19)$$

which is identical to Equation (12). It follows that the solution for the magnetic field is of the same form as that for the electric field $$H = H_0 e^{j\left(\omega t \pm (1-j)\sqrt{\frac{\omega\mu\sigma}{2}}x\right)} = H_0 e^{j\left(\omega t \pm \sqrt{\frac{\omega\mu\sigma}{2}}x\right)} e^{\sqrt{\frac{\omega\mu\sigma}{2}}x} \quad (20)$$

Since the imaginary co-efficient of x in Equations (13) and (20) describes how applied electric and magnetic fields decay within the conductor, it can be seen that the field has decayed to 1/e of its original strength when x has reached the skin depth; that is:

$$x = \delta = \sqrt{\frac{2}{\omega\mu\sigma}} \quad (21)$$

Equation (21) demonstrates that δ decreases with increasing ω, μ and σ and, as such, is small for a good electrical conductor, with high magnetic permeability, at high frequency. For example, for copper at 1 MHz, $\sigma = 6\times10^7\ \Omega^{-1}m^{-1}$, $\mu_0 = 4\pi\times10^{-7}\ Hm^{-1}$, $|\mu_r| \approx 1$. Hence δ=65 μm. Thus, there is negligible penetration of a copper screen by a time-varying electromagnetic field at 1 MHz and the screen behaves as an effective flux mirror. For a magnetic screen of the same σ, the magnetic permeability of the material is given by $\mu = \mu_r\mu_0 > \mu_0$, and δ is thus even smaller, thereby affording even more marked 'flux-mirror' performance.

Consider now an air-filled wire-wound inductor through which a d.c. current I flows. A magnetic field arises, the value of which is given approximately by:

$$nI = \frac{B}{\mu_0} \quad (22)$$

where n is the number of turns per unit length, B is the magnetic field strength inside the inductor, and $\mu_0$ is the permeability of free space.

The magnetic field pattern around and within the inductor resembles that of a bar magnet. Inside the inductor, lines of magnetic flux are uniformly distributed and parallel to the axis of the coil. Closed loops of flux extend into space outside the volume of the coil; entering one end and exiting the other; the strength of the magnetic field outside the inductor decays with distance from its centre.

When a sinusoidally varying current I(t) is applied to the coil, the magnitude of the resulting magnetic field in the region of the coil varies sinusoidally at the frequency ω of the modulated current, and its polarity reverses every half cycle.

If the metallic screen 12 is placed over the inductor 10, as in FIGS. 1a and 1b, magnetic flux penetrates significantly only to the skin depth of the metallic screen 12 at the frequency of the applied current as in Equation (20); hence, there is negligible magnetic flux penetration at radii greater than the screen outer radius.

In the arrangement of FIGS. 1a and 1b, the inductor 10 has a cross sectional area $A_C = \pi R_i^2$. The cross-sectional area $A_A$ of the annulus 14 between the inductor 10 and the screen 12 is given by the relation $\pi R_i^2 + A_A = \pi R_o^2$.

When the conducting screen 12 is in place, there is an induced current per unit length $J_{screen}$ at its inner surface due to the presence of the inductor's alternating magnetic field. This induced current in turn originates an additional magnetic field that opposes and modifies the field caused by the current in the inductor 10.

$B_A$ and $B_C$ denote the magnetic fields within the annulus 14 and the centre of the inductor 10 respectively. Since ∇·B=0.

$$B_A A_A = B_C A_C \quad (23)$$

By analogy with Equation (22):

$$\mu_0 nI = \mu_0 J_{Coil} = (B_A + B_C) \quad (24)$$

and $$B_A = \mu_0 J_{Screen} \quad (25)$$

where n is the number of turns per unit length, and $J_{coil}=nI$ is the effective current per unit length of the coil. Hence, ignoring finite length effects, the inductance per unit length L is given by:

$$L = \frac{nB_C A_C}{I} = \frac{\mu_0 n^2 B_C A_C}{(B_A + B_C)} \tag{26}$$

Substituting from Equation (23) into Equation (26):

$$L = \frac{2\mu_0 n^2}{\left\{\frac{1}{A_A} + \frac{1}{A_C}\right\}} \tag{27}$$

Equation (27) demonstrates that as $A_A$ tends to infinity, the inductance per unit length of the system tends to a maximum of $L_{max}=2\mu_0 n^2 A_C$ and that as $A_A$ tends to zero, so does L.

Figure 1C:
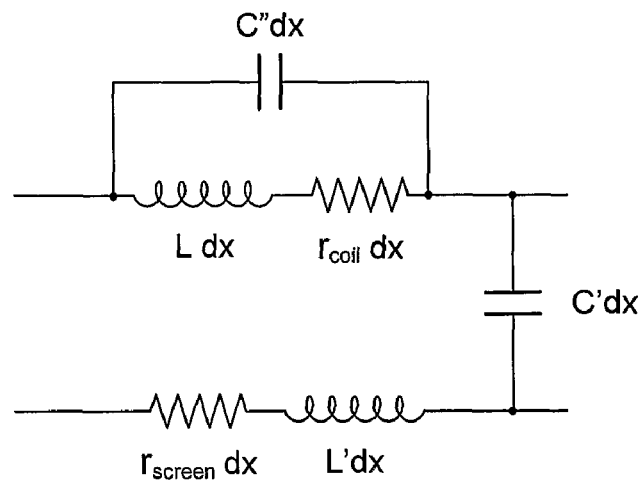
FIGS. 1c, 1d, 1e, and 1f are equivalent circuit diagrams.

The equivalent circuit of a differential length dx of this inductor/screen system resembles that of a "slow wave line" as seen in FIG. 1c where:
  L is the inductance per unit length from equation (27);
  L' is coaxial inductance per unit length of the system;
  C' is coaxial capacitance per unit length of the system;
  C" is inter-winding capacitance per unit length of the system; and
  $r_{coil}$ and $r_{screen}$ are the loss equivalent resistances per unit system length of the coil and screen respectively.

Figure 1D:
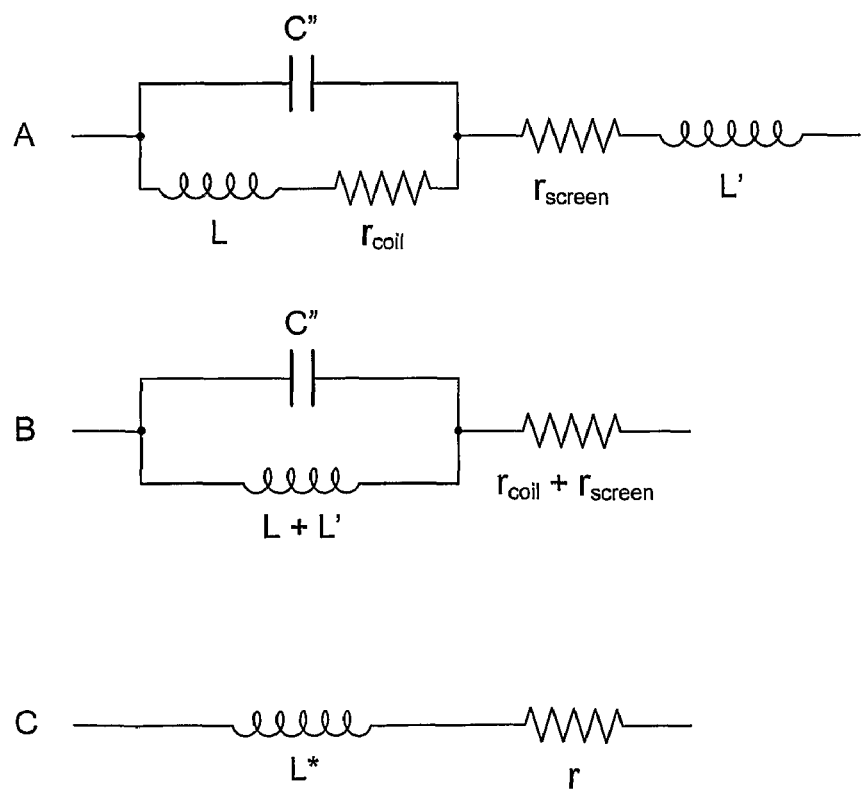
Figure 1E:
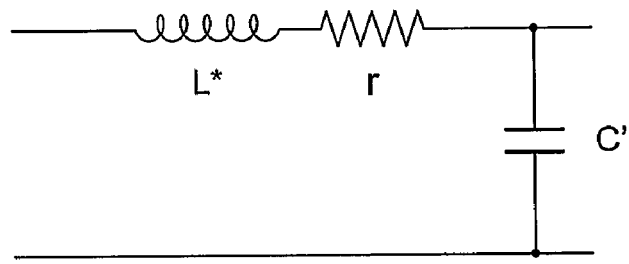

In practice, L'<<L and the admittance $Y_{C''}$<<$Y_L$ at operating frequency. Thus, $r_{screen}$ and L' may be referred (as shown in FIG. 1d where A, B and C are equivalent) to give the equivalent circuit shown in FIG. 1e where $r=r_{coil}+r_{screen}$ and L* is the parallel combination of C" and (L+L').

Figure 1F:
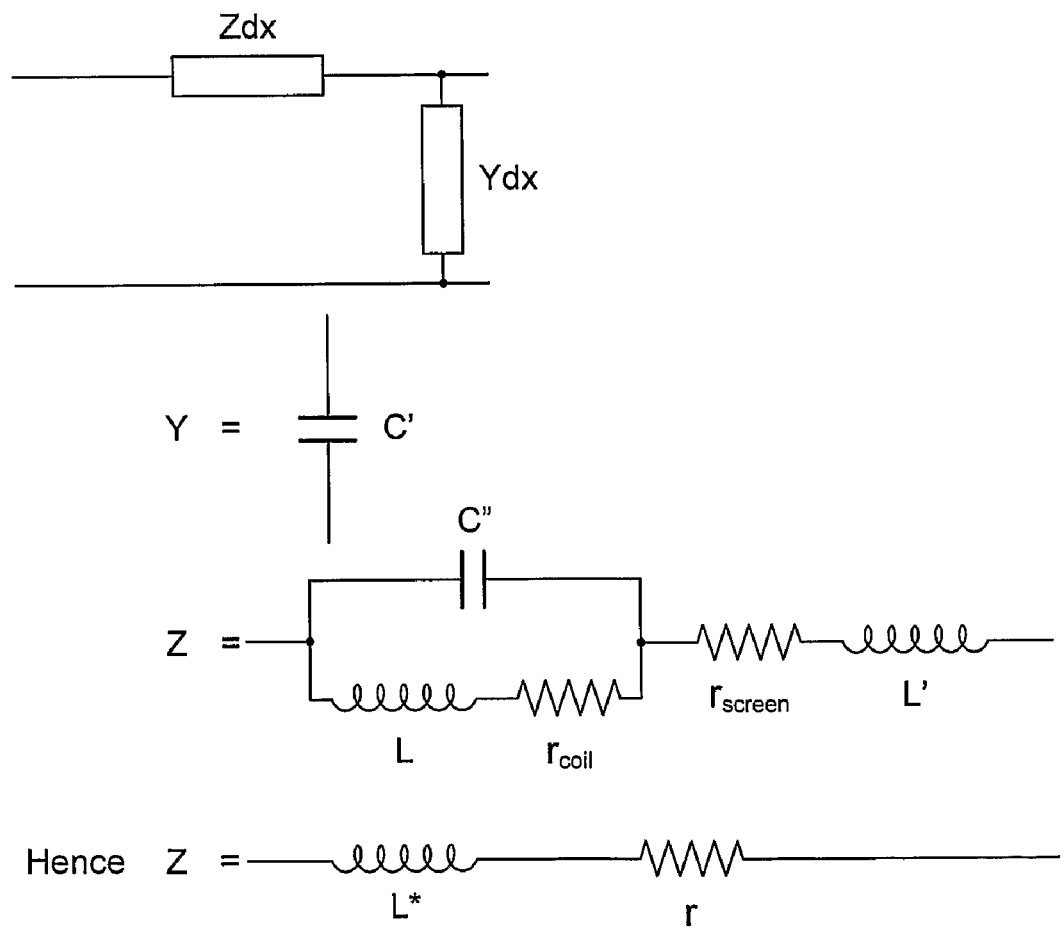

Analysing the system as a transmission line with series impedance Z and shunt admittance Y as shown in FIG. 1f, the characteristic impedance $Z_o$ of the line is given by:

$$Z_o = \sqrt{\frac{Z}{Y}} \tag{28}$$

and the input impedance of the line, as a function of the length l of the line, is given by:

$$Z_{in} = Z_o\left\{\frac{Z_L + jZ_o\tan\beta l}{Z_o + jZ_L\tan\beta l}\right\} \tag{29}$$

where $Z_L$ is the load impedance, and β is the propagation coefficient. In the model, the line is shorted at the load end, hence $Z_L$ is zero, and:

$$Z_{in} = jZ_o\tan\beta l = j\sqrt{\frac{Z}{Y}}\tan\beta l \tag{30}$$

such that if we approximate the line to be lossless (i.e. r<<ωL*), then:

$$Z_{in} \cong j\sqrt{\frac{L^*}{C'}}\tan\beta l \tag{31}$$

If reactance is added in parallel to this $Z_{in}$, the total admittance is zero at a frequency ω that depends on L* and hence on the displacement of the sensor screen. Tracking this value of ω provides a means of measuring the displacement.

The analysis is susceptible to further development for frequencies such that the wavelength λ>>l (i.e. the line length is only a small fraction of the wavelength of the propagating wave):

$$Z_{in} \cong j\sqrt{\frac{L^*}{C'}}\tan\beta l \tag{32}$$

β is the frequency dependent propagation coefficient which is given by:

$$\beta \cong \omega\sqrt{L^*C'} \tag{33}$$

Hence, substituting from Equation (33) into Equation (32):

$$Z_{in} \cong j\sqrt{\frac{L^*}{C'}}\omega\sqrt{L^*C'}\,l = j\omega L*l \tag{34}$$

Finally, denoting the total line inductance L*l by $L_T$ gives:

$$Z_{in}=j\omega L_T \tag{35}$$

With an external parallel capacitor $C_x$ this system resonates (i.e. has zero admittance) at a frequency given by:

$$\omega_0 = \frac{1}{\sqrt{C_x L_T}} \tag{36}$$

Hence the resonant frequency is:

$$\omega_0 \propto \frac{1}{\sqrt{L_T}} \propto \frac{1}{\sqrt{L}} \tag{37}$$

Hence, it can be seen from Equations (36) and (37) that a decrease in inductance L corresponds to an increase in the frequency of resonance $\omega_0$. Therefore, an increase in flux compression is measurable as an increase in frequency.

The quality factor Q of the resonant circuit described is given approximately by:

$$Q = \frac{\omega_0 L^*}{(r_{screen} + r_{coil})} \cong \frac{\omega_0 L_T}{rl} \tag{38}$$

where r is the loss-equivalent series resistance $r_{screen}+r_{coil}$ per unit length of the system and $\omega_0$ is its resonant frequency. Hence, substituting from Equation (36):

$$Q \propto \frac{\sqrt{L_T}}{r_{screen} + r_{coil}} \tag{39}$$

where $r_{screen}$ is defined such that the dissipative loss in the screen per unit length is given by $$\frac{1}{2}I_{coil}^2 r_{screen}.$$

Currents induced on the inner surface of the screen are significant only to the skin depth of the metal as defined in Equation (21). Hence, $$\frac{1}{2}I_{coil}^2 r_{screen} = \frac{1}{2}J_{screen}^2 \rho_{screen} \pi \frac{2R_o}{\delta_{screen}} \quad (40)$$

From Equations (24) and (25):

$$J_{screen} = J_{coil}\left\{\frac{B_A}{B_A + B_C}\right\} \quad (41)$$

Substituting from Equation (23) into Equation (41):

$$J_{screen} = \frac{J_{coil}}{1 + \frac{A_A}{A_C}} = \frac{I_{coil}^n}{\frac{R_o^2}{R_i^2}} \text{ (per unit length)} \quad (42)$$

Substituting Equation (42) into Equation (40):

$$\frac{1}{2}I_{coil}^2 r_{screen} = \frac{1}{2}I_{coil}^2 n^2 \frac{R_i^4}{R_o^4} \rho_{screen} \pi \frac{2R_o}{\delta_{screen}} \quad (43)$$

Hence:

$$r_{screen} = n^2 \frac{R_i^4}{R_o^4} \rho_{screen} \pi \frac{2R_o}{\delta_{screen}} \quad (44)$$

Similarly, $$r_{coil} = 2n^2 \frac{\rho_{coil}}{\delta_{coil}} R_i \quad (45)$$

and, if $\rho_{screen} = \rho_{coil} = \rho$ and $\delta_{screen} = \delta_{coil} = \delta$, then:

$$r = r_{screen} + r_{coil} = 2n^2 \frac{\rho}{\delta} R_i \left(1 + \pi\left(\frac{R_i}{R_o}\right)^3\right) \quad (46)$$

Hence, from Equations (39) and (46), we see that the Q of the resonant circuit drops as the radius of the outer screen decreases.

Thus, the introduction of a metallic screen of variable radius $R_o(x)$ around a wire-wound inductor within a resonant system as described above alters the Q of that circuit, and therefore would produce a measurable output, by three interconnected mechanisms:

1) As $R_o$ decreases, L decreases as in Equation (27) and hence $\omega_0$ increases as in Equation (37).

2) As $R_o$ decreases, $r_{screen}$ increases as in Equation (44).

3) As $\omega$ increases, $\delta$ decreases as in Equation (21), and hence $r_{coil}$ and $r_{screen}$ increase.

4) As a consequence of 1, 2 and 3 above, $$Q = \frac{1}{(r_{screen} + r_{coil})l}\sqrt{\frac{L_T}{C_x}}$$

decreases as $R_O$ decreases.

For high-speed, low resolution applications, Q monitoring is a cheaper, more effective solution than frequency counting.

The above analysis is extensible to cases of lower symmetry where a flux mirror invades a region containing magnetic flux; for example a toothed or gear wheel rotating close to a coil, such that the passing gear teeth compress the coil's magnetic flux. The associated change in Q of the coil may be used to monitor the speed of the gear. For further details, see the "Gear sensing application" towards the end of the description.

Using the mechanisms described above, a position sensor may be provided which is capable of accurately measuring the position of the inductor in relation to the screen (or vice versa). The performance of such a sensor would be insensitive to drift and 1/f noise, and instant wake-up would be a feature (i.e. on power up, the sensor would immediately output the correct position value without external interaction to calibrate it). If required, digital temperature compensation could be incorporated.

The operating frequency of such a sensor is inversely proportional to the root of the inductance of the working coil (see Equation 37). A high frequency of operation, and hence minimal inductance is desirable.

Linear Position Sensors

Figure 2A:
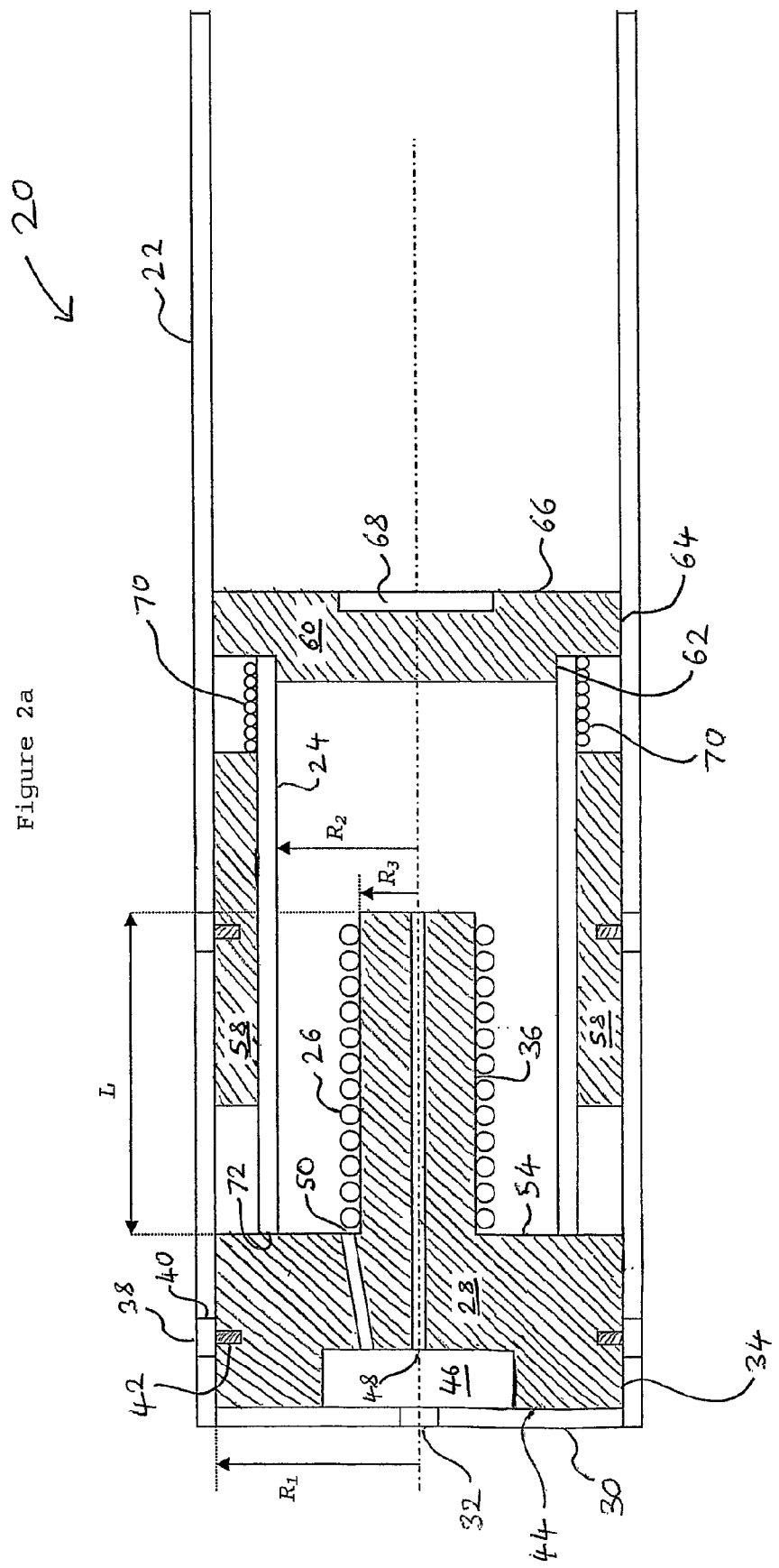
FIG. 2a shows an inner cylindrical screen completely shielding a coil.
Figure 2B:
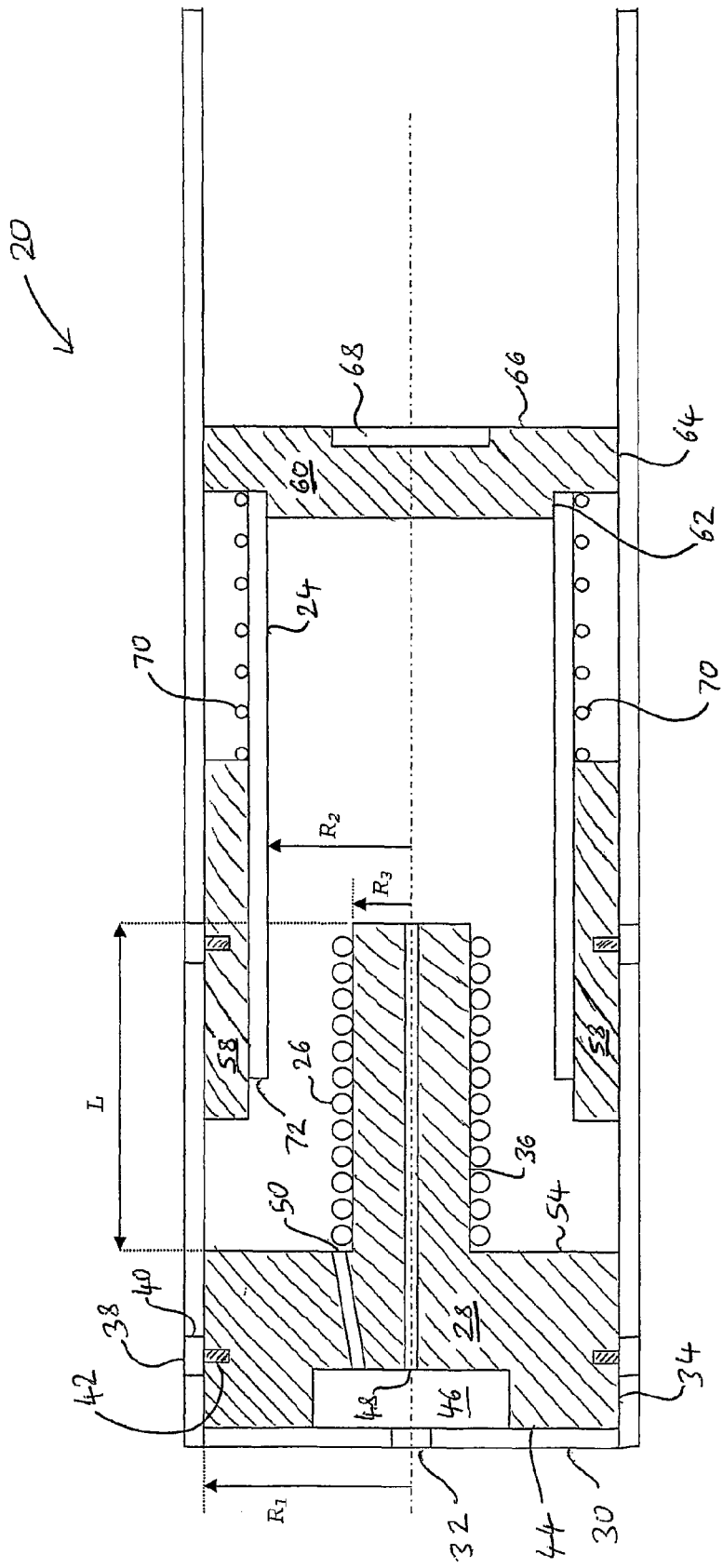
FIG. 2b shows the inner cylindrical screen at an intermediate position.
Figure 2C:
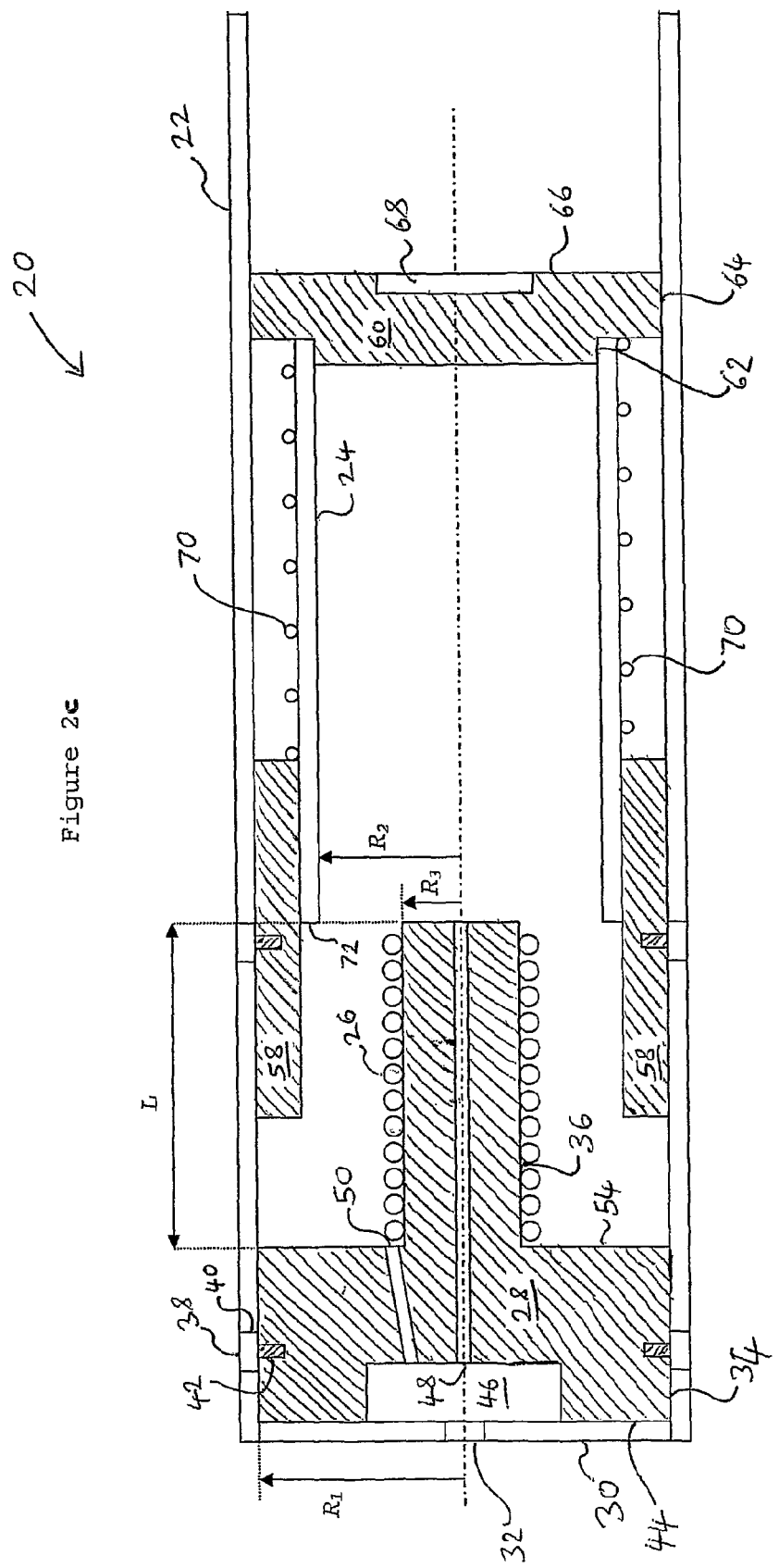
FIG. 2c shows the inner cylindrical screen completely remote from the coil.

Having explained the underlying theory, some examples of its application will now be described. Referring first to FIGS. 2a, 2b and 2c, a linear position sensor 20 according to one embodiment of the present invention is shown.

The linear position sensor 20 comprises an outer earthed cylindrical screen 22 having an internal radius $R_1$, an inner earthed cylindrical screen 24 having an internal radius $R_2$ (where $R_2 < R_1$), and a wire-wound inductor coil 26 having an internal radius $R_3$ (where $R_3 < R_2 < R_1$). The screens 22 and 24 are coaxial with the coil 26. The coil 26 has a length L is wound onto a former 28. The sensor 20 further comprises an oscillator circuit (not shown) which is connected to the coil 26.

The screens 22 and 24 are metallic and are good conductors. Alternatively, the screens could be manufactured from doped semiconductors. Preferably, the screens 22 and 24 are made of copper. The former 28 is a poor conductor. Preferably, the former 28 is made of PTFE. However, other materials (for these and other components of the sensor 20) are also contemplated within the scope of the invention. For example, the former 28 could alternatively be made of machineable ceramic, Tufnol, Nylon, Fibreglass, or Delrin.

The outer screen 22 is closed at one end by an end cap 30, such as a copper disc, which is soldered or welded into place. The end cap 30 comprises a central aperture 32 to accommodate a coaxial cable (not shown) which connects the coil 26 to the oscillator circuit. The outer screen 22 may be mounted to a stand or base (not shown).

The former 28 comprises a first cylindrical portion 34 having a radius equal to the radius $R_1$. The former 28 further comprises a second cylindrical portion 36 which is coaxial with the first cylindrical portion 34 and protrudes from it. The coil 26 is wound around the second cylindrical portion 36. A radius of the second cylindrical portion 36 is equal to the radius $R_2$.

The first cylindrical portion 34 is secured to the outer screen 22. This may be accomplished by screwing screws 38 through apertures 40 in the outer screen 22 into threaded apertures 42 in the first cylindrical portion 34. A first end 44 of the first cylindrical portion 34 is flush with a surface of the end cap 30. The first cylindrical portion 34 comprises a central cylindrical recess 46 extending coaxially from the first end 44 into the first cylindrical portion 34. The recess 46 enables electrical connections to be made to an oscillator, power source and earth. In an alternative embodiment, a space may be provided between the end cap 30 and the first cylindrical portion 34 to accommodate the oscillator circuitry, etc.

Two straight holes are drilled completely through the former 28 to accommodate various wires. A first hole 48 extends along the axis of the former 28. A second hole 50 extends from the recess 46 to a second end 54 of the first cylindrical portion 34, exiting the second end 54 at a radial location just beyond $R_3$. The first and second holes 48 and 50 accommodate wires connected to the two ends of the coil 26.

The inner screen 24 is maintained at a constant radial distance from the outer screen 22 using a tubular PTFE spacer 58 which is secured to the outer screen 22. The inner screen 24 may move freely relative to the spacer 58 in an axial direction.

The inner screen 24 is closed at an end remote from the coil 26 by a metallic end cap 60. The end cap 60 comprises a first cylindrical portion 62 which fits tightly inside the inner screen 24 and is secured to it. The end cap 60 further comprises a second cylindrical portion 64 which has a radius approximately equal to the inner radius of the outer screen 22, an O-ring groove is cut into this portion into which a coil spring or piece of conducting braid is inserted such that the second cylindrical portion 64 makes good electrical contact with the outer screen 22 but is able to move axially relative to it. An end 66 of the second cylindrical portion 64 which is remote from the coil 26 comprises a central cylindrical recess 68 extending coaxially from the end 66 into the second cylindrical portion 64. For the purposes of device demonstration, the recess 68 is adapted to accommodate an end of a micrometer shaft (not shown). In a practical application of this embodiment, it is envisioned that the micrometer could be replaced by a moving object. or device, the position of which it is desirable to measure. The micrometer is mounted to a stand or base and allows the inner screen 24 to move relative to the outer screen 22.

The inner screen 24 is sprung using a coaxial spring 70 which resides in the axial space between the spacer 58 and the end cap 60, and in the radial space between screens 22 and 24. In an alternative embodiment, the movement of the inner screen is not sprung.

Ratios of $R_1$, $R_2$, $R_3$ and L are determined so as to achieve the desired device frequency displacement relation.

In use, the sensor 20 may be used to sense the position of an object (not shown). The object may be a moving object. This is accomplished by attaching the object to the inner screen 24, either directly or indirectly, so that as the object moves, the inner screen 24 also moves. For example, as mentioned above, the recess 68 could be adapted to receive the object. Thus, by sensing the position of the inner screen 24, the absolute or relative position of the object is also sensed.

The inner screen 24 may move between a first position in which it completely shields the coil 26 as shown in FIG. 2a, and a second position in which it is completely remote from the coil 26 as shown in FIG. 2c. In the second position of FIG. 2c, the coil is shielded by the outer screen 22 rather than the inner screen 24. FIG. 2b shows an intermediate position.

The output resonant frequency of the oscillator circuit, which is related to the extent of flux compression as described above, is dependent upon an axial position of the inner screen 24. The response of the sensor 20 to unit linear displacement of the inner screen 24 is expected to be monotonic in frequency. Since the geometry of the sensor 20 exhibits translational uniformity, profile-dependent end effects would not occur. Such a device could be used to accurately measure the position of rapidly moving reciprocating parts. With an oscillator operating at 10 MHz with stability of one part in $10^7$, and a maximum change in carrier frequency between maximum and minimum screening conditions of 1 MHz, a resolution of $10^4$ is expected to kHz measurement frequency (where, by Nyquist's criterion, the measurement frequency is equal to at least twice the maximum frequency component of the object's motion). The range of the sensor 20 is determined by the length of the coil 26. Therefore, in order to minimise the inductance of such a system, a coil with a turn-space ratio of around 1 is preferred.

Flat copper wire may be used to improve the homogeneity of the operating radio-frequency electromagnetic fields. Alternatively, two, three, or four coils in parallel may be used in place of a single coil. The coils may be manufactured by screw-cutting techniques (i.e. double/triple/quadruple cut threads). With a double thread, the pitch of the coil is necessarily doubled, the inductance per unit length halved, and the coils perfectly coupled. Hence, when the two inductors are connected in parallel, the inductance is equivalent to that of a single thread coil.

Figure 2D:
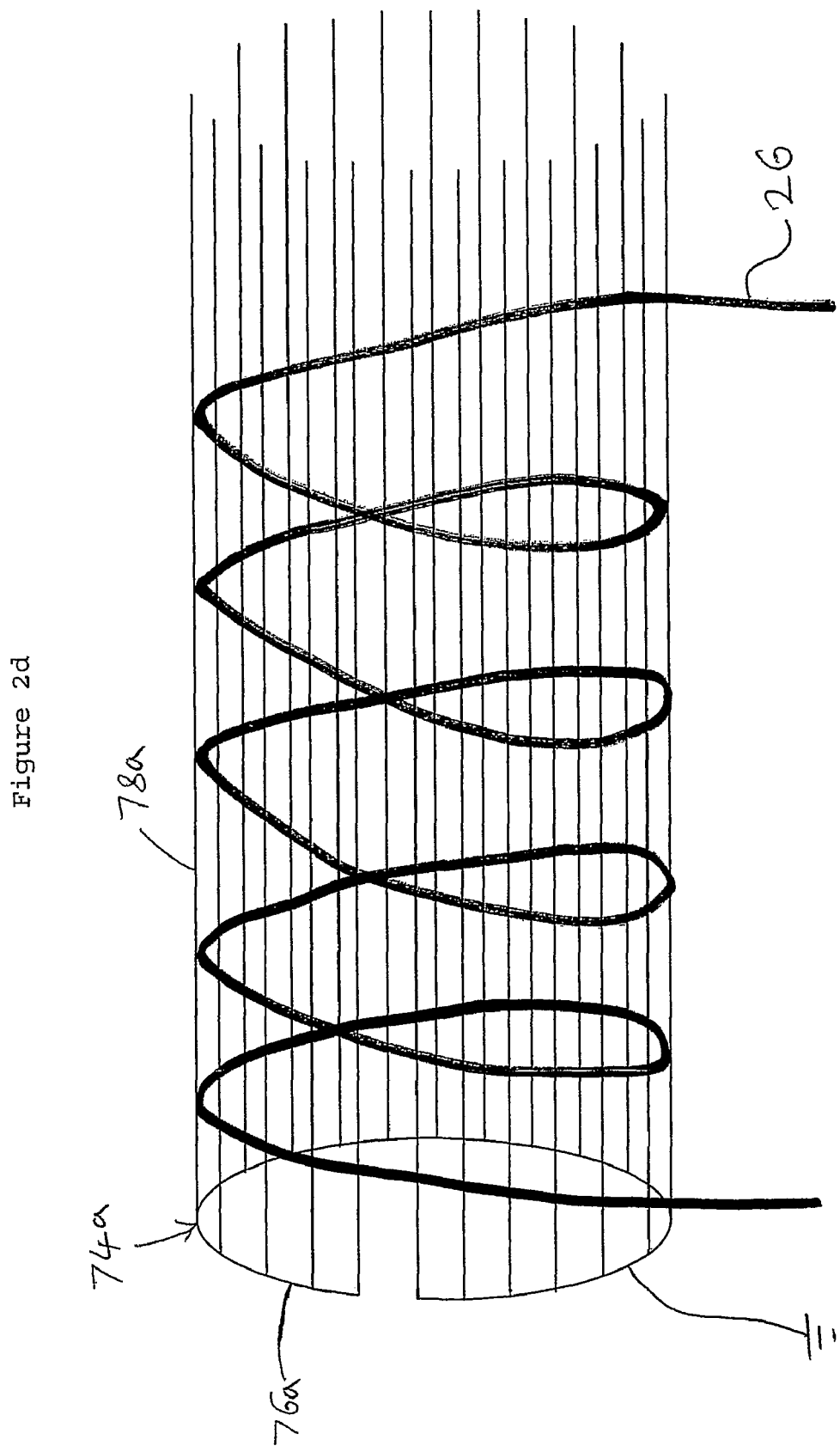
FIGS. 2d and 2e show a Parrot Cage Screen to fit around the coil.
Figure 2E:
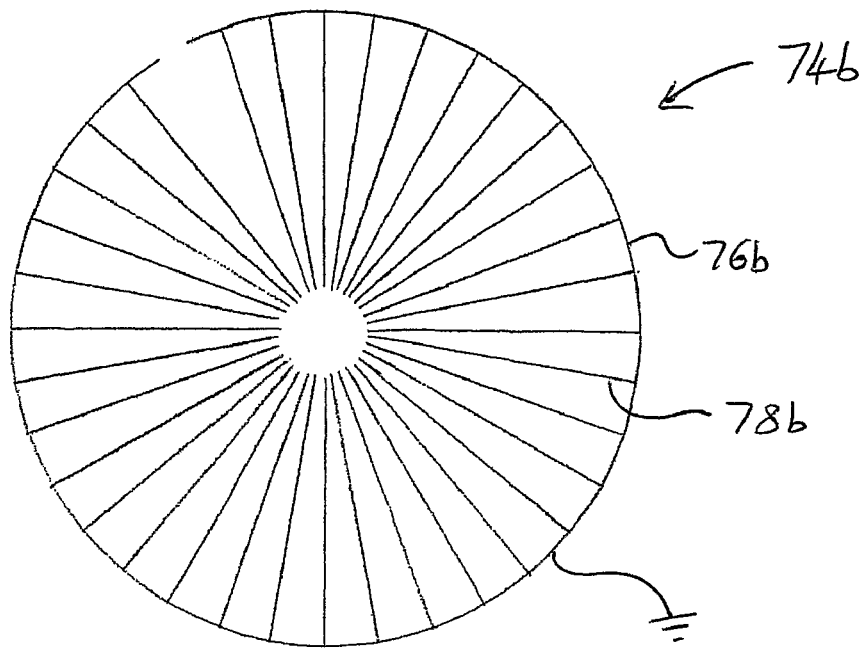

The behaviour of sensor 20 is affected by variations in stray capacitance between the coil 26 and the screens 22 and 24. Therefore, in a preferred embodiment, a two part Parrot Cage Screen (PCS) 74 is fitted to minimise this effect. The PCS may be manufactured so as to have a negligible effect on the radio-frequency electromagnetic field upon which the behaviour of the sensor 20 depends. A first part 74a of the PCS is fitted coaxially around the coil 26 as shown in FIG. 2d, and a second part 74b of the PCS is fitted at the end of the coil 26 as shown in FIG. 2e. In FIG. 2d, the first part 74a comprises an earthed wire 76a shaped so as to form a circle having a small arc of its circumference missing. Parallel wires 78a extend from the earthed wire 76a in a direction perpendicular to the plane of the circle at regular intervals around the circle. In use, the first part 74a is placed coaxially over the coil 26 so that the wires 78a extend parallel to the axis of the coil 26. The second part 74b is designed to be fitted on the end of the coil 26 so as to screen the end of the coil 26 from capacitive effects. The second part 74b consists of a further incomplete earthed wire loop 76b with attached lengths of wire 78b extending radially inwards from the wire loop 76b. A PCS such as that shown in FIGS. 2d and 2e may also be used in conjunction with other sensor embodiments described below.

Figure 3A:
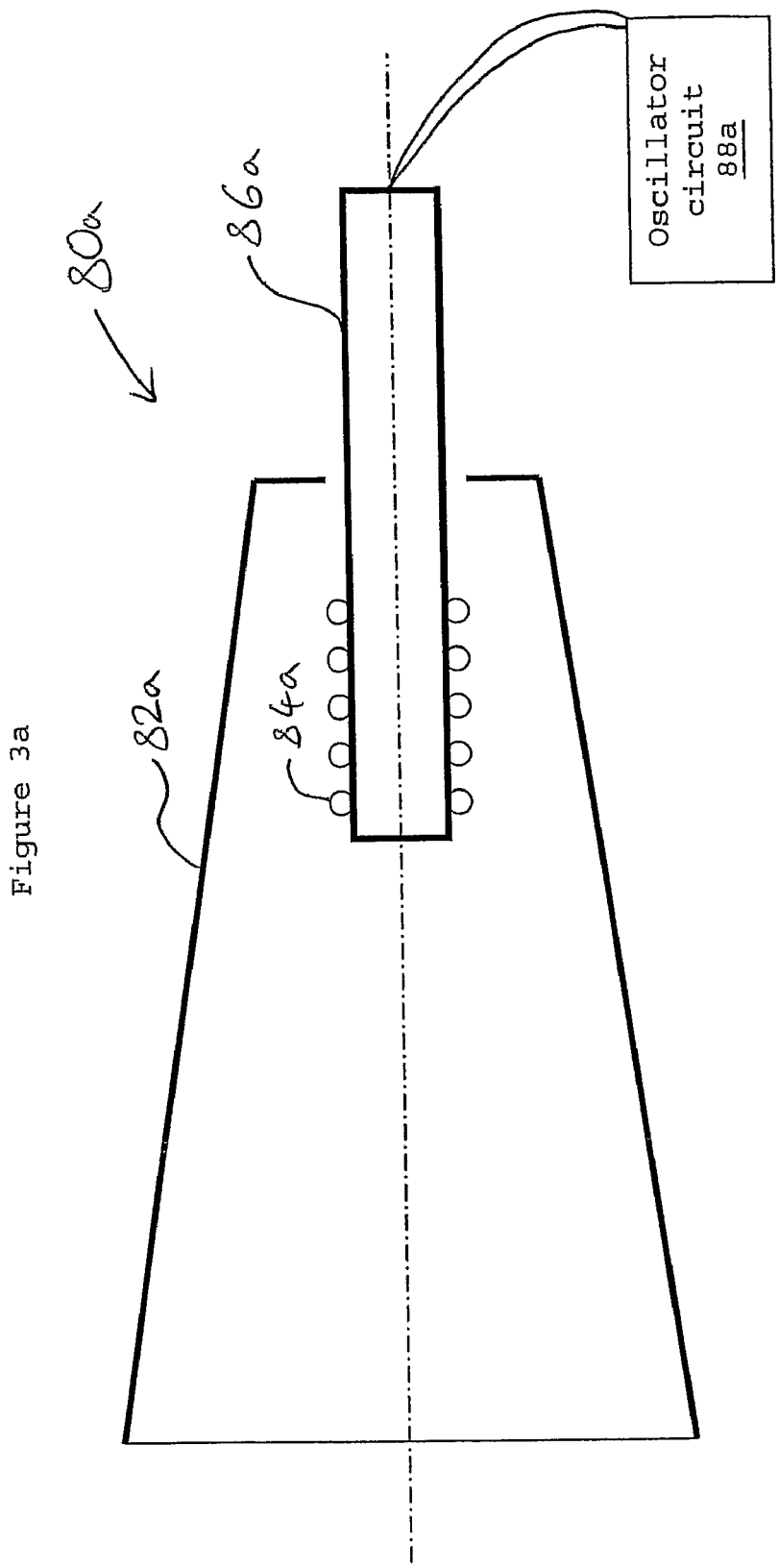
FIGS. 3a and 3b are linear position sensors according to alternative embodiments of the present invention in which the screen is tapered.

FIG. 3a shows a linear position sensor 80a according to another embodiment of the present invention. This embodiment is largely similar to the previous embodiment except for the explicit differences described.

The linear position sensor 80a comprises a tapered screen 82a, a wire-wound inductor coil 84a which is wound onto a former 86, and an oscillator circuit 88a connected to the coil 84a. In contrast to the previous embodiment, there is no second screen.

The coil 84a is substantially cylindrical with a longitudinal axis indicated by the dot-dash line in FIG. 2. The tapered screen 82a is coaxial with the coil 84a, and has a circular cross-section with a radius that varies in an axial direction. The tapered screen 82a is able to move in an axial direction with respect to the coil 84a.

The output resonant frequency of the oscillator circuit 88a, which is related to the extent of flux compression as described above, is dependent upon an axial position of the coil 84 within the tapered screen 82*a*.

In order to obtain a linear relationship between the movement of the coil into the tapered screen and the frequency shift of the system (i.e. f∝Kx), recall from equation (37) that:

$$f \propto \frac{1}{\sqrt{L}} \quad (47)$$

where ω=2πf, and therefore:

$$f \propto \sqrt{\frac{1}{A_A} + \frac{1}{A_C}} \quad (48)$$

Hence, it is possible to show that, for a linear relationship, we must arrange for:

$$R_o^2 = R_i^2 + \frac{1}{\left(Kx^2 - \frac{1}{R_i^2}\right)} \quad (49)$$

Figure 3B:
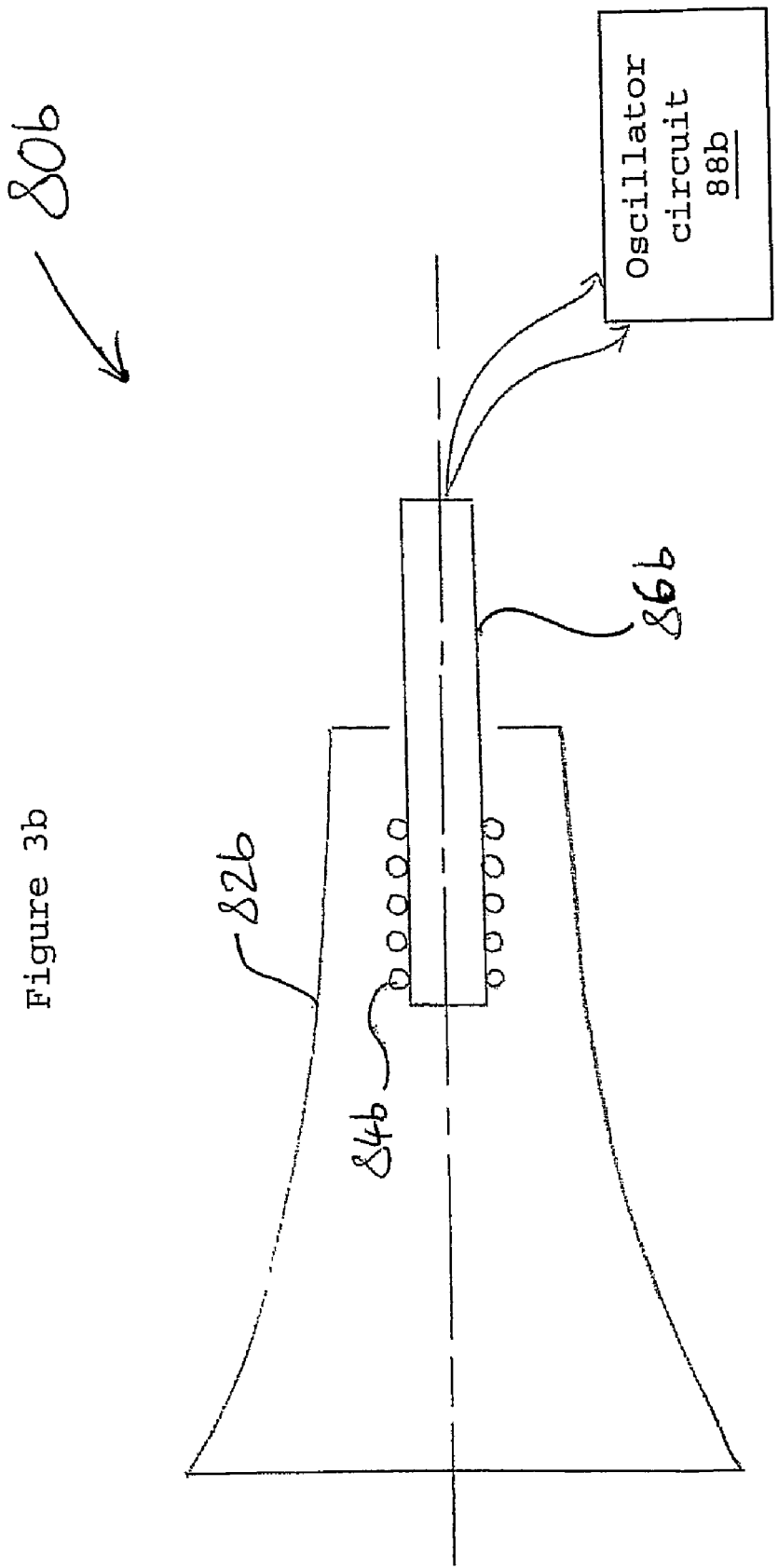

A position sensor 80*b* having a tapered screen 82*b* according to Equation (49) is shown schematically in FIG. 3*b*.

It should be noted that the analysis that leads to Equation (49) makes the assumption that the length of the coil 84 is short compared to the system length (i.e. the length of the tapered screen 82). End effects are ignored in the idealised system but expected to influence the behaviour of a real device.

Such a sensor could be used to accurately measure the position of rapidly moving reciprocating parts. With an oscillator operating at 10 MHz with stability of one part in $10^7$, and a maximum change in carrier frequency between maximum and minimum screening conditions of 1 MHz, a resolution of $10^4$ is expected to kHz measurement frequency (where, by Nyquist's criterion, the measurement frequency is equal to at least twice the maximum frequency component of the object's motion). The output of the sensor 80 is given by the convolution of the aperture (taper) function of the tapered screen 82 and the profile of the wire used in the coil 84. Hence the performance of the sensor 80 is insensitive to localised surface or bulk inhomogeneities in the wire.

The coils 26 and 84 used in the linear position sensors 20 and 80 described above may be wound from wire of varying cross-sectional area in order to linearise the sensor response. In alternative embodiments, coils 26 and 84 may be wound from wire of varying cross-sectional area to produce sensors 20 and 80 with desired non-linear characteristics. It is envisaged that coils 26 and 84 may be etched onto printed circuit board.

Figure 4:
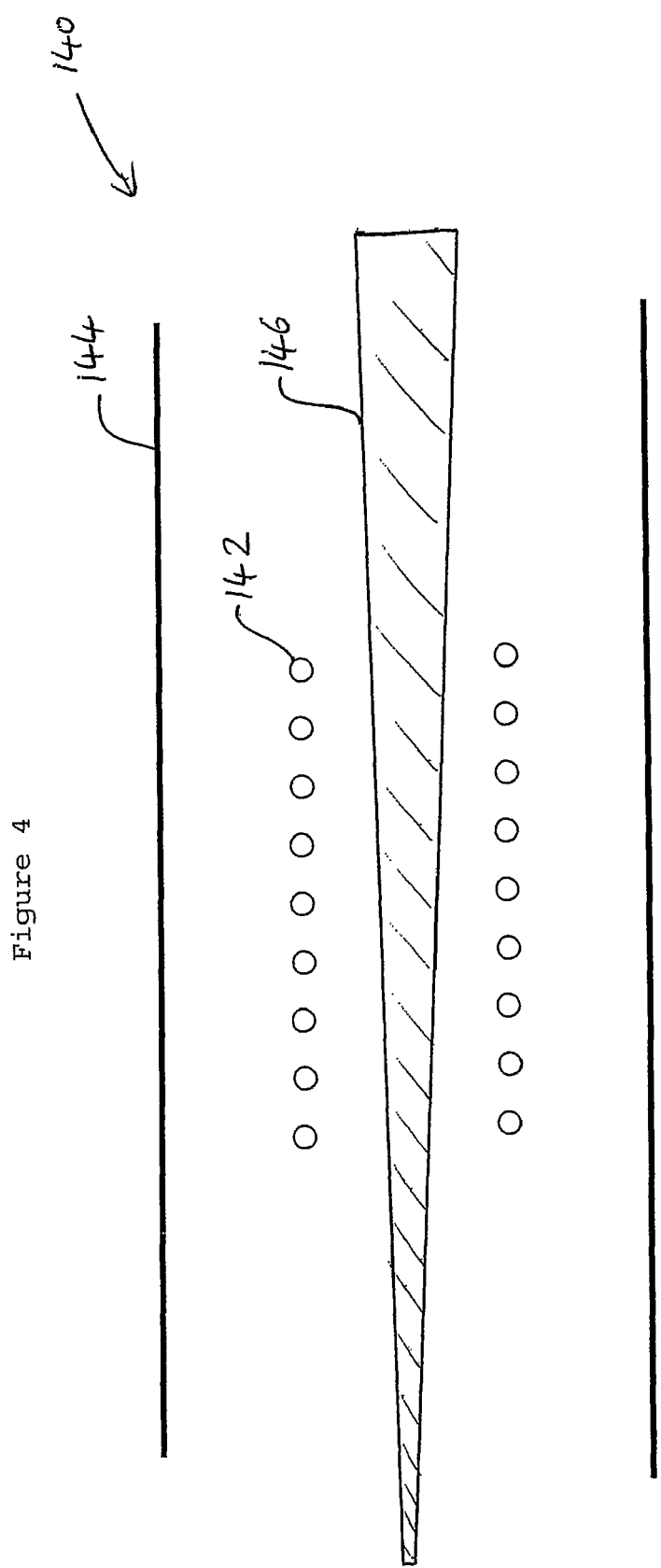
FIG. 4 is a linear position sensor according to a further embodiment of the present invention.

FIG. 4 shows a cross section of a linear position sensor 140 according to a further embodiment of the present invention. The sensor 140 comprises a coil 142, and a coaxial cylindrical metallic screen 144. As in the previous embodiments, the sensor 140 further comprises an oscillator circuit (not shown) attached to the coil 142.

In use, a metallic wire or rod 146 of varying radius is placed coaxially within the coil 142 and is moveable in an axial direction. Axial movement of the wire or rod 146 through the centre of the coil 142 produces a Q or frequency shift proportional to the radius of the wire or rod 146 by the flux-compression mechanism described above. Thus the sensor 140 may be used to detect the axial position of the wire or rod 146 within the coil 142.

The sensor 140 is insensitive to movements of the wire or rod 146 perpendicular to its axis. The sensor 140 may therefore be used as a basis for an angular position measurement device insensitive to endfloat. In an alternative embodiment, the sensor 140 may be used for sensitive real-time monitoring or measuring of the diameters of metallic wires, cylinders or rods (of any diameter).

Angular Position Sensors

Figure 5:
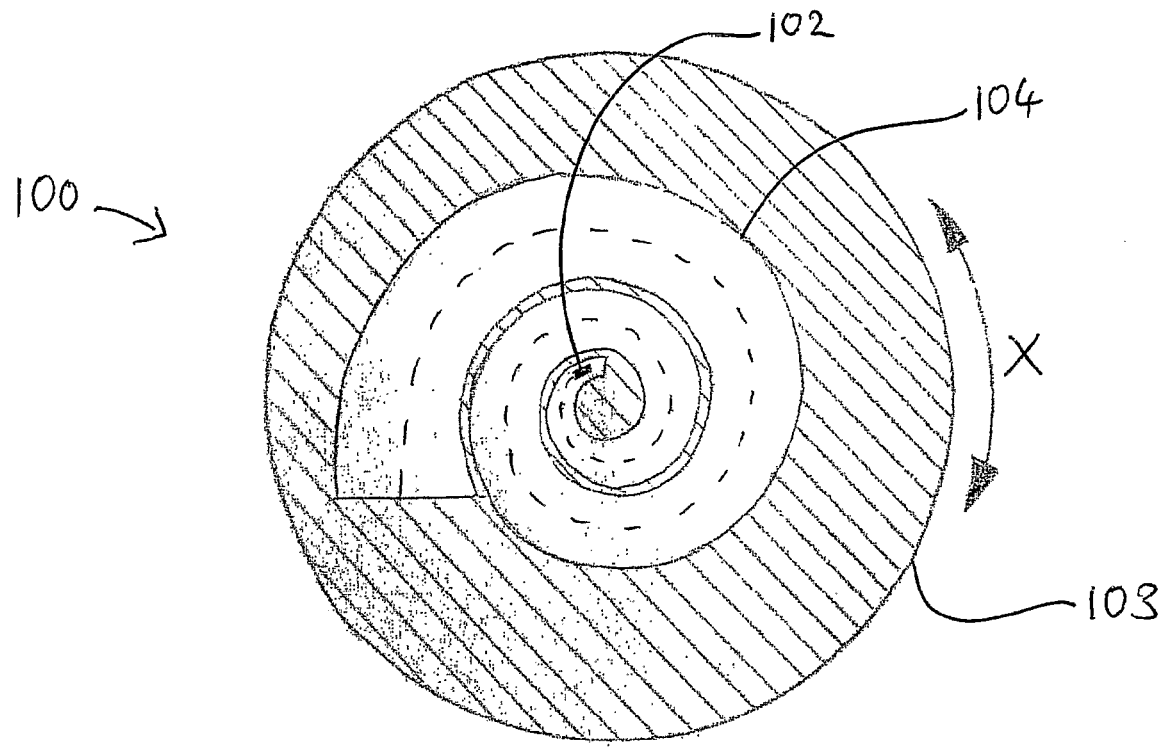
FIG. 5 is an angular position sensor according to one embodiment of the present invention.

FIG. 5 shows a cross section of an angular position sensor 100 according to an embodiment of the present invention. The sensor 100 comprises a coil 102 located partially within a recess in one side of a base plate (not shown), and a metallic disc 103. As in the previous embodiments, the sensor 100 further comprises an oscillator circuit (not shown) attached to the coil 102.

The disc 103 has a tapered spiral recess 104 on one side. The spiral recess 104 forms an outward spiral originating from near the centre of the disc 103 and terminating before reaching the edge of the disc 103. The spiral recess 104 is tapered such that its width decreases towards the centre of the spiral.

In use, the base plate is oriented horizontally such that the base plate recess is located in the upper side of the base plate. The coil 102 has a horizontal longitudinal axis, and is partially contained within the base plate recess. The disc 103 is then placed parallel to and above the base plate. The disc 103 is oriented such that the spiral recess 104 is located in the lower side of the disc 103. Thus, the coil 102 is contained within an enclosed volume comprising the base plate recess and the spiral recess 104. Preferably, the coil 102 is located such that its longitudinal axis is coplanar with the lower side of the disc 103 and the upper side of the base plate (i.e. the coil 102 is half contained within the base plate recess and is half contained within the spiral recess 104).

The disc 103 is able to move in an angular direction as shown by the arrow X. Thus, the coil 102 may move within the spiral recess 104 along the dashed line shown in FIG. 4 such that an axis of the coil 102 is always tangential to a spiral path (i.e. the dashed line) at the centre of the spiral recess 104.

The output resonant frequency of the oscillator circuit, which is related to the extent of flux compression, is dependent upon an angular position of the coil 102 within the spiral recess 104. Thus, this construction provides a multi-turn angular position sensor with an achievable resolution of less than 0.1°.

It will be appreciated that alternative orientations of the sensor 100 could also be used.

FIG. 6 shows an angular position sensor 110 according to another embodiment of the present invention. The sensor 110 comprises a coil 112 located partially within a recess in one side of a base plate (not shown), and a disc 114 of depth D. As in the previous embodiments, the sensor 110 further comprises an oscillator circuit (not shown) attached to the coil 112. FIG. 6*a* is a horizontal section, FIG. 6*b* is a vertical section along AA', FIGS. 6*c* and 6*d* are vertical sections along OX viewed in directions B and C respectively, and FIG. 6*e* is a vertical section along OY.

The disc 114 has a coaxial annular recess 116 in one side. The recess 116 is adapted to accommodate at least a portion of the coil 112. A depth of the recess 116 varies smoothly with angular position around the disc 114 except at 0/360° where the region of greatest depth meets the region of least depth (see line OX in FIG. 6*a*). In a preferred embodiment, the disc 114 may be manufactured from an injection moulded plastic coated with a conducting layer.

In use, the base plate is oriented horizontally such that the base plate recess is located in the upper side of the base plate. The coil 112 has a horizontal longitudinal axis, and is partially contained within the base plate recess. The disc 114 is then placed parallel to and above the base plate. The disc 114 is oriented such that the annular recess 116 is located in the lower side of the disc 114. Thus, the coil 112 is contained within an enclosed volume comprising the base plate recess and the annular recess 116. Preferably, as shown in FIG. 6e, the coil 112 is located such that its longitudinal axis is coplanar with the lower side of the disc 114 and the upper side of the base plate (i.e. the coil 112 is half contained within the base plate recess and is half contained within the annular recess 116).

The disc 114 is rotatable about it centre (point O in FIG. 5a). Thus, the degree of flux compression of the coil 112 by the disc 114 varies according to the angular position of the disc 114. Similarly, the frequency output of the oscillator circuit also varies according to the angular position. The step change in frequency at 0/360 degrees may be logged by digital circuitry. Thus a highly accurate multi-turn angular position sensor 110 is provided.

Figure 7:
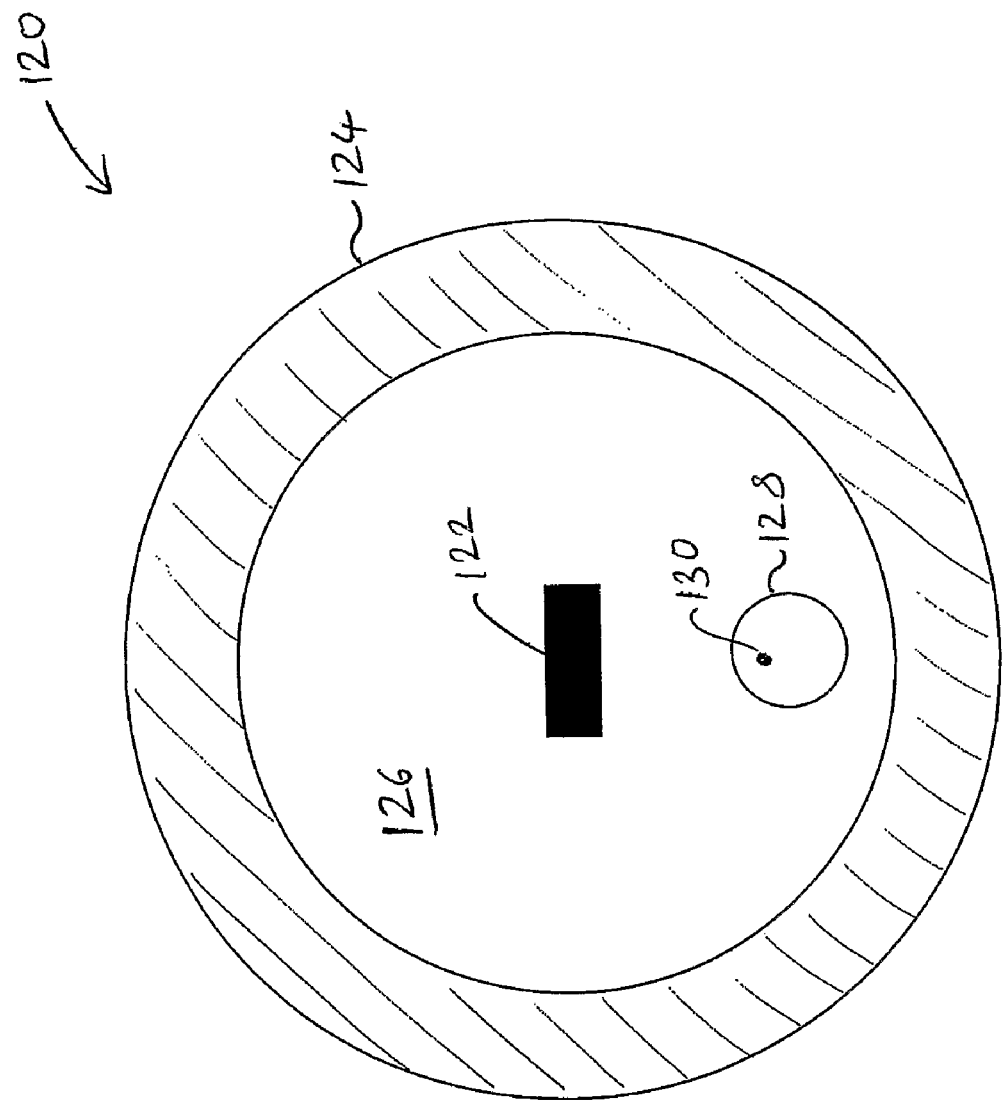
FIG. 7 is an angular position sensor according to another embodiment of the present invention.

A further alternative embodiment of an angular position sensor 120 according to the present invention is shown in FIG. 7. The sensor 120 comprises a coil 122, a base plate 124 having a recess 126, a metallic part 128, and a top plate (not shown). As in the previous embodiments, the sensor 100 further comprises an oscillator circuit (not shown) attached to the coil 102.

In the embodiment of FIG. 7, the base plate 124 is substantially cylindrical and has a depth smaller than its radius. The recess 126 is also cylindrical and is coaxial with the base plate 124. Alternatively, the recess need not be cylindrical and/or coaxial. The coil 122 is located approximately centrally in the recess 126 with its axis perpendicular to the base plate axis. The top plate confines the flux vertically within the recess 126 of the base plate 124.

The metallic part 128 is located in the recess 126 adjacent to the coil 122 in a direction perpendicular to the axis of the coil 122. In this embodiment, the metallic part 128 is a disc having an eccentric axis of rotation 130 that is parallel to the axis of the disc and to the axis of the base plate 124. Nonetheless, it will be appreciated that alternative arrangements are also possible. For example, the metallic part 128 could be any piece of metallic material with application specific, determinable geometry which could be rotated within the recess 126 so as to vary the distance between a section of its metallic surface and the coil 124.

In use, the output resonant frequency of the oscillator circuit, which is related to the extent of flux compression of the coil 124, is dependent upon an angular position of the metallic part 128 about its eccentric axis 130.

Figure 8:
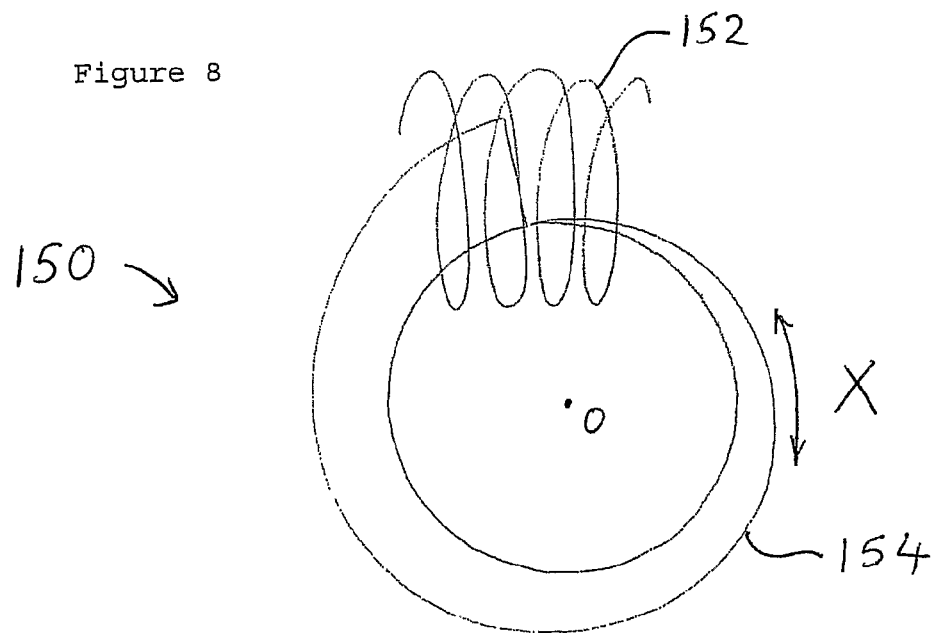
FIG. 8 is an angular position sensor according to a further embodiment of the present invention.

FIG. 8 shows an angular position sensor 150 according to another embodiment of the present invention. The sensor 150 comprises a coil 152, an outer screen (not shown), and a metallic tapered component 154. As in the previous embodiments, the sensor 150 further comprises an oscillator circuit (not shown) attached to the coil 152.

In this embodiment, the tapered component 154 has a circular cross-section and is tapered between a first end 154a and a second end 154b. The tapered component 154 is approximately shaped into a circle having a centre point O such that the first and second ends 154a and 154b are located adjacent to one another. The tapered component 154 passes through the coil 152.

In use, the coil 152 has a fixed position whilst the tapered component is rotatable through 360 degrees about the point O, as shown by arrow X. The output resonant frequency of the oscillator circuit, which is related to the extent of flux compression of the coil 154 by the tapered component 154 and the outer screen, is dependent upon an angular rotation of the tapered component 154 about point O. The sensor 150 is insensitive to lateral movement of the tapered component 154 within the coil 152, and so will deliver high angular resolution even when operated with poor bearings.

Dual Lane Position Sensors

It is envisioned that in some applications it will be desirable to have a dual lane position sensor (i.e. one exhibiting some degree of redundancy). The following schemes illustrate possible ways of achieving this; though what follows by no means constitutes an exhaustive list.

In a first embodiment of a dual lane position sensor according to the present invention, two coils are interwound. One set of electronics operates both coils alternately. This is achieved by rapid switching between coils by means of a three-position switch. The sequence of operation would be as follows (or similar): coil 1 active, both coils active, coil 2 active. The coils would be perfectly coupled, the output therefore for a given position input is expected to be identical in all three operating regimes. It will be appreciated that any of the linear or angular position sensors described above could be modified to become a dual lane position sensor of this type.

Figure 9:
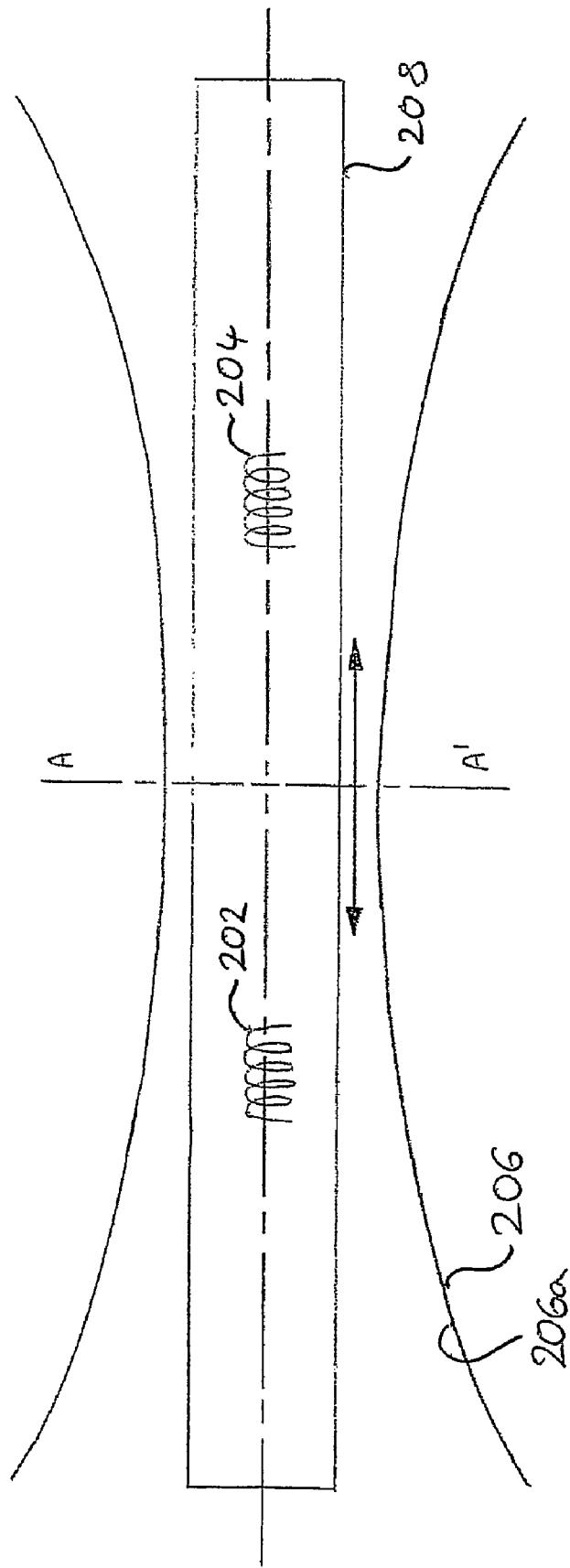
FIG. 9 is a dual lane linear position sensor according to an embodiment of the present invention.

A second embodiment of a dual lane position sensor 200 is shown in FIG. 9. Two coils 202 and 204 are arranged within a screen 206. The screen 206 is symmetrical about a line AA' in FIG. 9, with each half having a profile similar to that of the tapered screen embodiment of FIG. 3b (so as to obtain a linear response).

The coils may be set into an insulating rod 208, made of epoxy, for example. Thus, by moving the rod 208, the coils 202 and 204 may be moved axially within the screen 206. An inner surface 210 of the screen 206 is conducting. It may be machined, or injection moulded from plastic; if it is injection moulded, the screen 206 may be metal-plated either on the inside or the outside. Either would result in a satisfactory screen. The two coils 202 and 204 may be operated by separate electronics.

Figure 10:
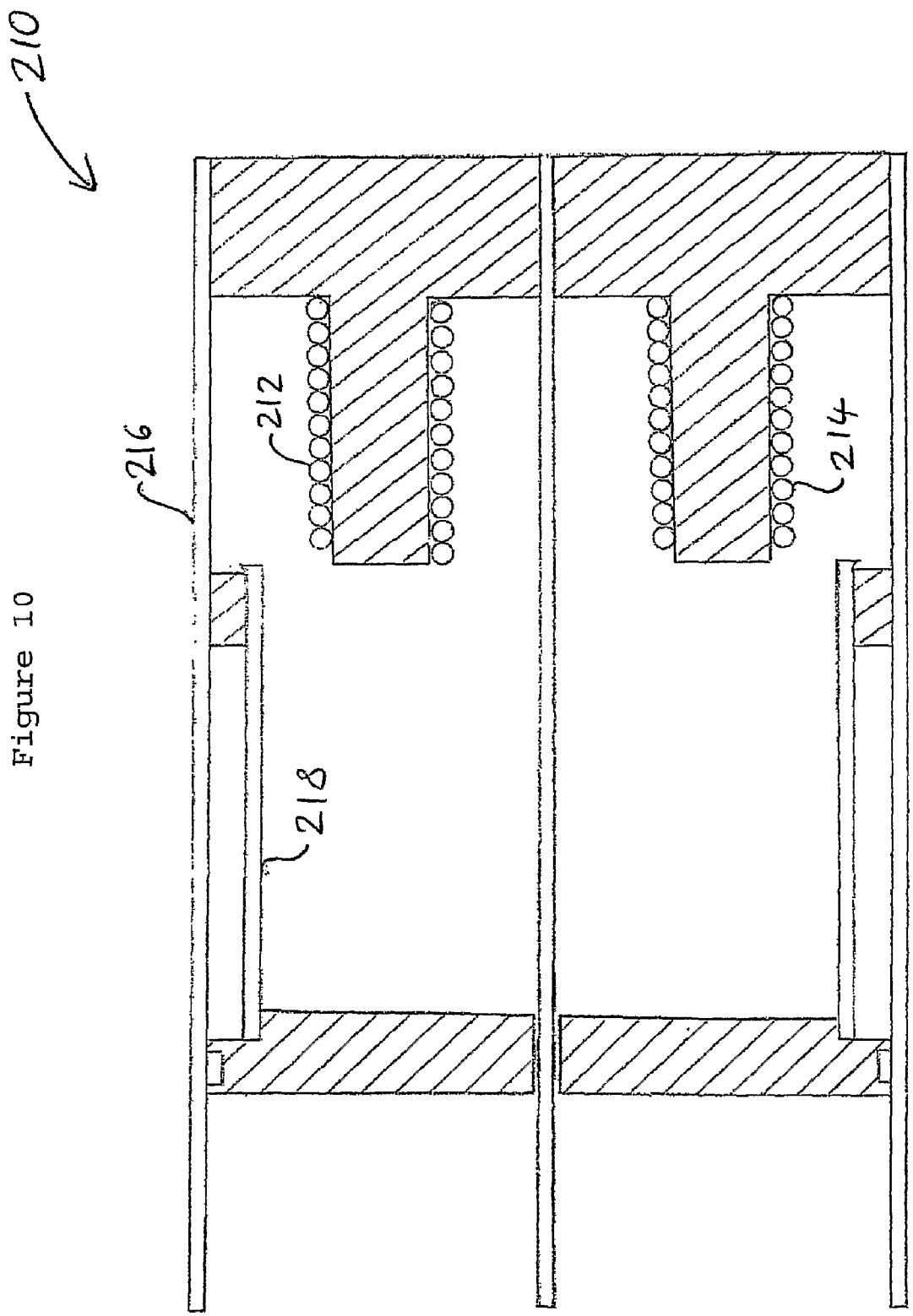
FIG. 10 is a dual lane linear position sensor according to another embodiment of the present invention.

A third embodiment of a dual lane position sensor 210 is shown in FIG. 10. The sensor 210 comprises two independently operating coils 212 and 214 built into a simple dual-lane system. The flux is confined by an outer screen 216 and an inner screen 218. The inner screen 218 is moveable relative to the coils 212 and 214.

Figure 11:
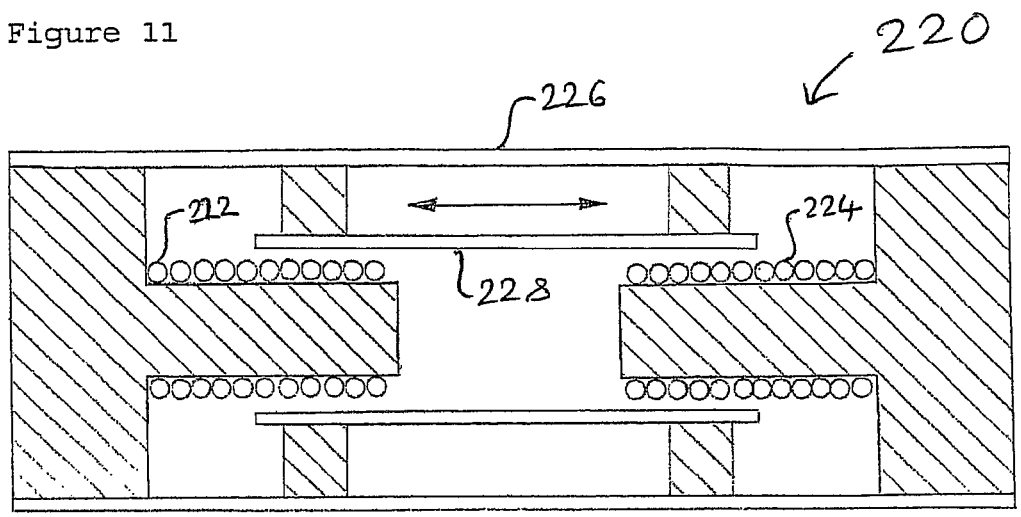
FIG. 11 is a dual lane linear position sensor according to a further embodiment of the present invention.

A fourth embodiment of a dual lane position sensor 220 is shown in FIG. 11. The sensor 220 comprises two coils 222 and 224, and an outer screen 226 and an inner screen 228 to confine the flux. The inner screen 228 is moveable relative to the coils 222 and 224.

Figure 12:
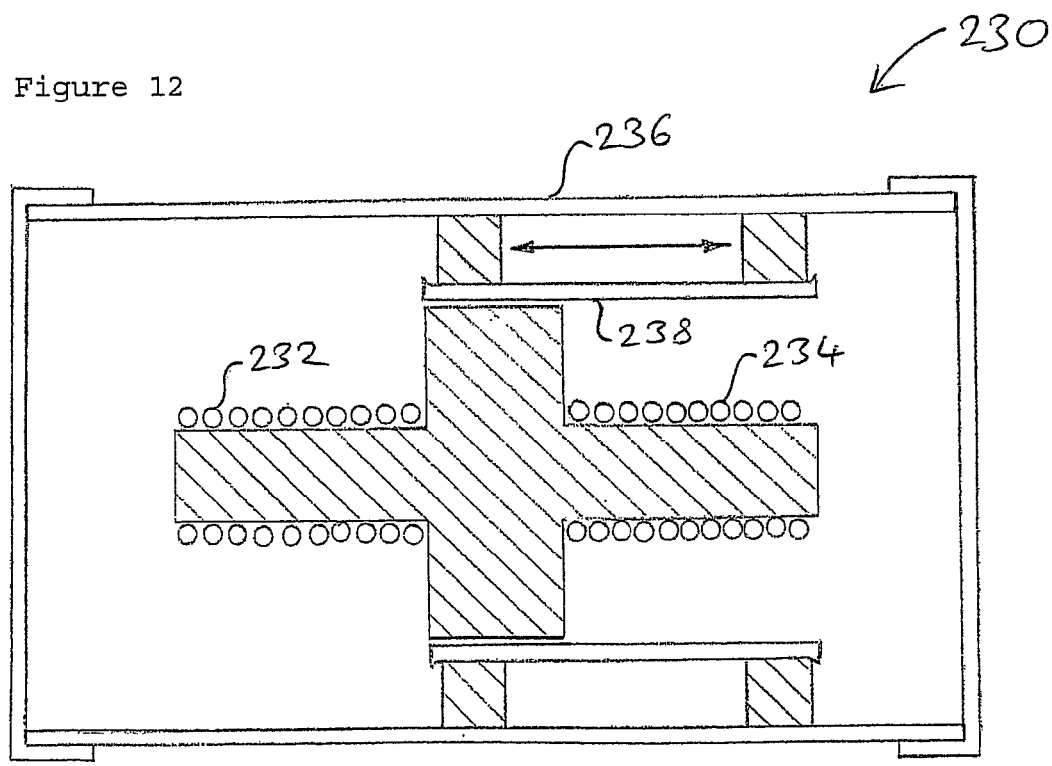
FIG. 12 is a dual lane linear position sensor according to another embodiment of the present invention.

A fifth embodiment of a dual lane position sensor 230 is shown in FIG. 12. The sensor 230 comprises two coils 232 and 234, and an outer screen 236 and an inner screen 238 to confine the flux. The inner screen 238 is moveable relative to the coils 232 and 234.

Figure 13:
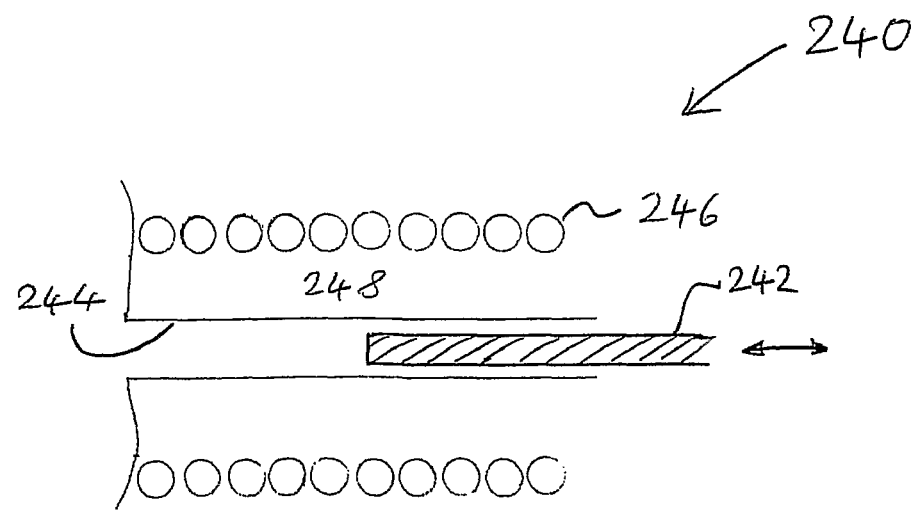
FIG. 13 illustrates a tuning mechanism for a dual lane linear position sensor according to an embodiment of the present invention.

It is envisioned that a mechanism for tuning a dual lane position sensor may be required to compensate for manufacturing tolerances and to ensure that the output of both sensor coils is consistent. Such a system 240 is illustrated in FIG. 13. The coil 246 is embedded in a non-conducting "filler" 248. The tuning is achieved by screwing or unscrewing a metallic rod 242 into the centre 244 of one or both of the coils 246. Movement of the rod 242 is indicated by arrow X. As the rod 242 moves, it will affect the screening of the flux and thus the output of the sensor. In this way, the sensor output may be tuned.

Alternatively one of the coils may be shimmed relative to the other.

Temperature Compensation

For non-thermostatic position sensing applications it is envisioned that a means to temperature compensate a position sensor may be required. Indeed, one advantage of the present position sensor over current technology is that it is easily thermally compensated. Possible schemes of temperature compensation are described below, but other schemes are also contemplated within the scope of the present invention.

In a first temperature compensation scheme, non-conducting magnetic particles are introduced into the vicinity of the volume occupied by the RF magnetic field. For example, a dilute garnet may be introduced, in which the dilution is chosen to engineer the magnetic ordering temperature according to the operating temperature range of the sensor. Ferromagnetic, antiferromagnetic and paramagnetic species may be introduced (used above their ordering temperature).

The following relation may be used to determine the quantity of each species required for optimum temperature correction:

$$\chi = \sum_i \frac{c_i}{T} + \sum_j \frac{c_j}{T+\theta_j} + \sum_k \frac{c_k}{T-T_{N_k}} \quad (50)$$

where $c_{i,j,k}$ are determined by the Curie constant and by the quantity of magnetic species introduced (the subscripts i, j and k refer to paramagnetic, ferromagnetic and antiferromagnetic species respectively). $c_i, c_j, c_k, \theta_j, T_{N_k}$ should be chosen to provide temperature correction over the required temperature range.

In a second temperature compensation scheme, temperature compensation is achieved by anchoring the coil within the system at a particular point along its axis in order to determine the direction of coil expansion/contraction. Such a scheme is only suitable for use with certain sensor embodiments.

In a third temperature compensation scheme, a shaft on which the sensor or coil is mounted may be manufactured from materials with different (known) coefficients of thermal expansion. In this way, the thermal expansion effects can be nullified.

Driving Circuitry

Figure 14A:
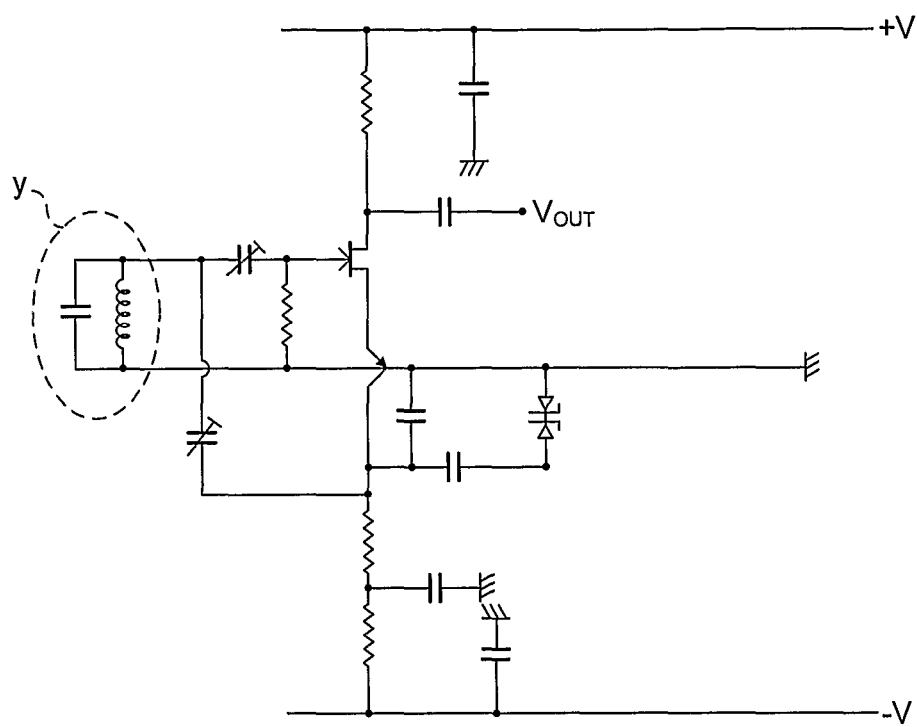
FIGS. 14a, 14b and 14c show embodiments of driving circuitry for a position sensor according to the present invention.
Figure 14B:
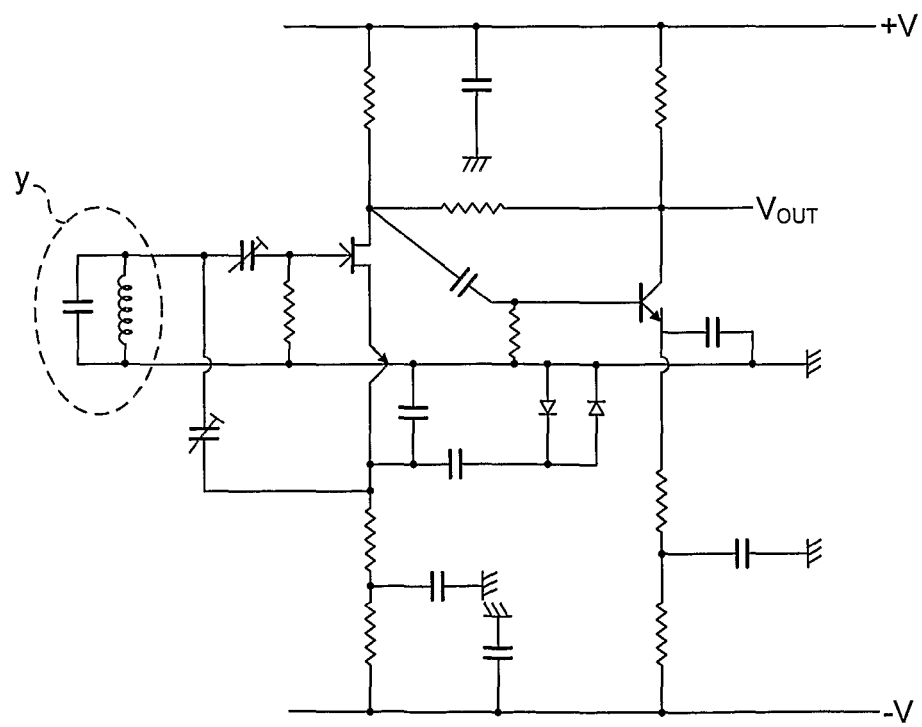
Figure 14C:
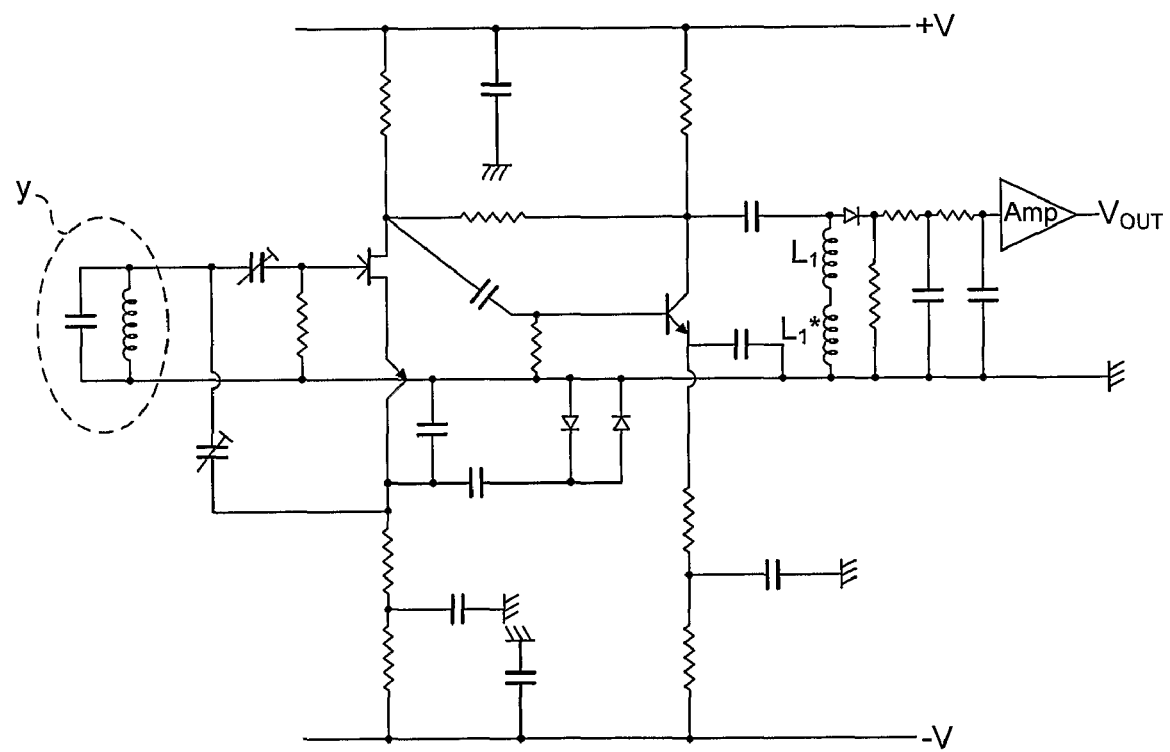

FIGS. 14a, 14b and 14c show three examples of driving circuitry for a position sensor according to the present invention. These schemes are for the purpose of illustration only, many other schemes could be implemented. In each of FIGS. 14a, 14b and 14c, the sensor "head" is indicated by the dashed line Y. In FIG. 14c, inductors $L_1$ and $L_1^*$ are an a-static pair.

Resolution-bandwidth Analysis

Figure 15:
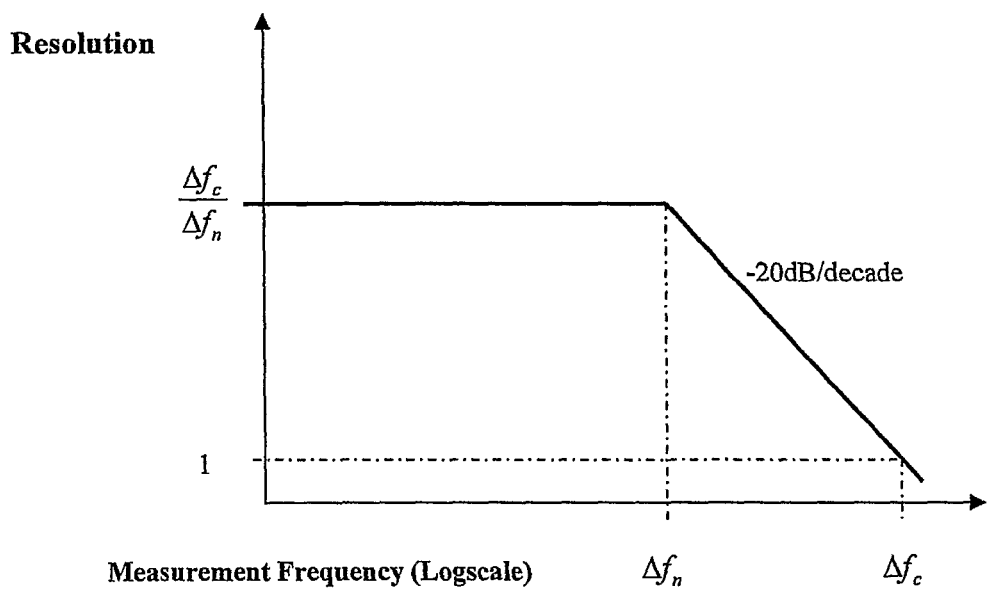
FIG. 15 illustrates the resolution-bandwidth properties of a position sensor according to the present invention.

It is possible to perform a resolution-bandwidth analysis of a sensor according to the present invention, as below (see also FIG. 15). Such an analysis illustrates the high resolution possible with the present sensor.

The resolution of the sensor is defined as the fraction of full sensor travel that is resolvable (i.e. [measurement range/smallest measurable displacement]). The bandwidth of the sensor is defined as the maximum frequency of moving object $f_{ob}$ that can be measured, which is related to the measurement frequency $f_m$ by:

$$\text{Bandwidth} = f_{ob}^{max} = \frac{1}{2} f_m^{min} \quad (51)$$

Furthermore, let us denote the maximum change in carrier frequency over the measurement range by $\Delta f_c$, and the maximum change in frequency due to noise as $\Delta f_n$.

In the noise dominated region, the low frequency resolution of the sensor is given by:

$$\text{Resolution} = \frac{\Delta f_c}{\Delta f_n} \quad (52)$$

This resolution extends from d.c. to a measurement frequency of $\Delta f_n$ as shown in FIG. 8.

In the uncertainty dominated region, at measurement frequencies above $\Delta f_n$, the resolution is given by:

$$\text{Resolution} = \frac{\Delta f_c}{f_m} \quad (53)$$

so that the resolution drops off at −20 dB/decade, reaching unity at a measurement frequency of $\Delta f_c$ as shown in FIG. 8.

By analogy with the gain-bandwidth product of an operational amplifier, the sensor has a resolution-bandwidth product equal to $\Delta f_c/2$.

Gear Sensing Application

An angular position sensor according to the present invention may be used to detect the position of toothed wheels or cams. It should be appreciated that there are many ways of realising a high accuracy device using the technology. One possible device arrangement is described below, together with corresponding performance characteristics.

In the description that follows the term "gear" will be used to describe the toothed gear/cam etc., the position of which it is desirable to measure.

The position of a gear of N teeth is to be measured using the teeth of that gear as "targets", i.e. the teeth of the gear act as the moveable screen for the angular position sensor. $\tau_{gear}$ is defined as the time taken for the gear to complete one revolution, $f_{gear}$ is the frequency of rotation of the gear (i.e. $1/\tau_{gear}$), and one tooth width is defined as 360/N degrees.

Two sensor heads are used. These are positioned around the circumference of the gear, displaced from each other by $2n+\frac{1}{2}$ tooth widths, where n is an integer $1 \leq n \leq N/2$. The sensitive volume of each sensor head is equal to one tooth width. For each sensor head, maximum screening occurs when the gear tooth occupies the sensitive volume of the device, minimum screening when the inter-tooth space lies within the sensitive volume.

Figure 16:
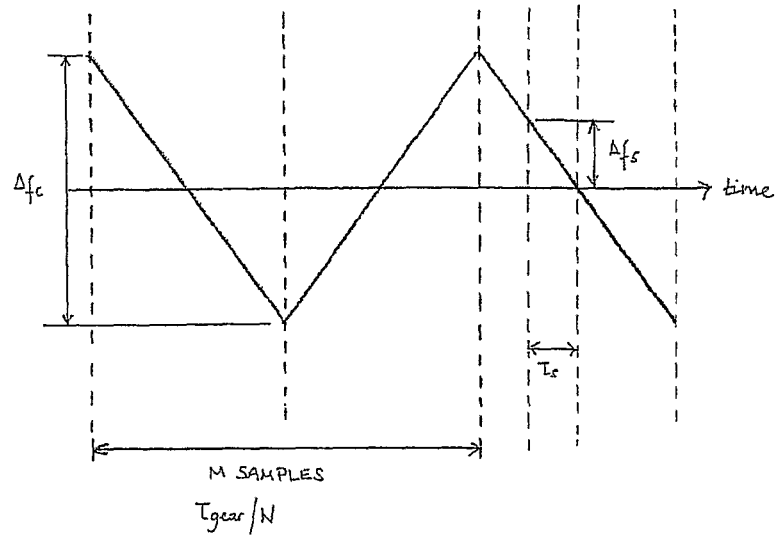
FIG. 16 schematically illustrates the frequency response of a position sensor according to an embodiment of the present invention when used in a gear sensing application.

M samples are taken in the time taken for one tooth to pass one sensor head. The change from the maximum to minimum screening condition causes a frequency shift $\Delta f_c$ of the electronic carrier frequency $f_c$ as the tooth passes the device, as shown schematically in FIG. 16 (the graph is not to scale, and the form of the graph is simplified to a triangle-wave for the purposes of illustration). We define the sampling time $\tau_s$ as:

$$\tau_s = \frac{\tau_{gear}}{N} \frac{1}{M} \quad (54)$$

As the gear rotates, the signals received by the two sensors are in quadrature (i.e. out of phase by exactly 90°). As the teeth pass the sensor heads, data is read from the two sensors alternately so as to read data continuously within the signal region exhibiting greatest rate of change. (The response of the device to unit angular displacement of the gear will be non-linear, it is envisioned that a digital 'look-up' method would be employed for data-processing purposes).

We define frequency resolution by:

$$\Delta f_s = \frac{1}{\tau_s} = \Delta f_{gear} MN \tag{55}$$

where $\Delta f_c$ is the carrier frequency shift (peak to peak). From FIG. 16, it is clear that:

$$\frac{\Delta f_c}{\Delta f_s} = \frac{M}{2} \tag{56}$$

Therefore, combining Equations (55) and (56), we find that:

$$M = \sqrt{\frac{2}{N} \frac{\Delta f_c}{\Delta f_{gear}}} \tag{57}$$

The figure of merit for the device is given by:

$$F = \frac{360}{N} \frac{1}{M}$$

and the resolution in degrees of the device by:

$$R = 360 \sqrt{\frac{f_{gear}}{2N\alpha f_c}} \tag{58}$$

where α is a constant equal to the fractional maximum carrier frequency shift (e.g. 0.1 for a 10% effect).

The device has the following key advantages over technologies currently employed (e.g. inductive methods, magnetic code-wheel readers):

The teeth of the gear may be used as targets for the sensor such that no code-wheel or magnetic target or modification to the face of the gear is required.

Superior resolution.

Ruggedness and reliability.

Temperature compensation easily achieved.

The direction of rotation of the gear may be obtained from the output of the device. The device can deliver absolute gear position if a "marker" (i.e. a small irregularity) is present on one of the gear teeth, or if the arrangement of teeth is known and asymmetric.

Table 1 illustrates the resolution R of the proposed device for a gear of 60 teeth, a carrier frequency of 200 MHz with α=0.1:

TABLE 1

| Speed of rotation of wheel (rpm) | $f_{gear}$ (Hz) | N | R (degrees) |
|---|---|---|---|
| 2000 | 33 | 60 | 0.042 |
| 3000 | 50 | 60 | 0.052 |
| 4000 | 67 | 60 | 0.060 |
| 5000 | 83 | 60 | 0.067 |
| 6000 | 100 | 60 | 0.073 |
| 7000 | 117 | 60 | 0.079 |
| 8000 | 133 | 60 | 0.085 |
| 9000 | 150 | 60 | 0.090 |
| 10000 | 167 | 60 | 0.095 |

Although preferred embodiments of the invention have been described, it is to be understood that these are by way of example only and that various modifications may be contemplated. For example, the gear sensing application described above is merely one application of a position sensor according to the present invention. It will be appreciated that many other applications are also contemplated within the scope of the present invention, e.g. sensing the position of a plunger in fuel meter, sensing the position of a topslide position on a lathe.

The invention claimed is:

1. A position sensor comprising:
   a sensor electromagnetic field generator comprising a coil and a capacitive element which together form a resonant circuit;
   a screen arranged to confine the sensor electromagnetic field such that the screen behaves as an effective flux mirror; and
   an output arranged to provide a signal which varies in dependence upon at least one of a resonant frequency and a quality factor of the resonant circuit, the resonant frequency and the quality factor being related to an amount of flux compression of the electromagnetic field resulting from the presence of the screen, the amount of flux compression being related to a position of the screen in relation to the sensor electromagnetic field generator.

2. The position sensor of claim 1 in which the sensor further comprises a Parrot Cage Screen disposed coaxially about the coil to reduce variations in stray capacitance between the coil and the screen.

3. The position sensor of claim 1 in which the sensor is a linear position sensor, the flux compression being related to a linear position of the screen in relation to the sensor electromagnetic field generator.

4. The position sensor of claim 3 in which the screen comprises a tubular screen adapted to coaxially receive the coil, the tubular screen being movable in an axial direction relative to the coil.

5. The position sensor of claim 4 in which the tubular screen is tapered.

6. The position sensor of claim 5 in which the tapering is such that the resonant frequency is linearly related to the axial position of the coil within the tubular screen.

7. The position sensor of claim 4 in which the tubular screen is a first cylindrical screen and the sensor further comprises a metallic outer cylindrical screen disposed coaxially around the first cylindrical screen and the coil, the outer cylindrical screen being fixed in an axial direction with respect to the coil, and the first cylindrical screen being movable in an axial direction in a space between the coil and the outer cylindrical screen such that the resonant frequency is monotonically related to the axial position of the first cylindrical screen relative to the coil and the outer cylindrical screen.

8. The position sensor of claim 3 in which the screen comprises an outer screen adapted to receive the coil, and a long tapered part disposed axially through the coil, the long tapered part being moveable in an axial direction relative to the coil such that the flux compression is related to the axial position of the long tapered part relative to the coil.

9. The position sensor of claim 1 in which the sensor is an angular position sensor, the flux compression being related to an angular position of the screen in relation to the sensor electromagnetic field generator.

10. The position sensor of claim 9 in which the screen comprises a spiral recess, the coil being located at least partially within the recess, and the coil being movable within the recess such that a longitudinal axis of the coil remains tangential to a spiral path at the centre of the recess.

11. The position sensor of claim 10 in which the recess is tapered such that its radius decreases towards the centre of the spiral.

12. The position sensor of claim 9 in which the screen comprises an annular recess having a depth that varies with angular position around the recess, the coil being at least partially received within the recess, and the coil being movable within the recess such that a longitudinal axis of the coil remains tangential to a circular path at the centre of the recess.

13. The position sensor of claim 9 in which the screen comprises an outer screen and a metallic part, the outer screen enclosing the metallic part and the coil, and the flux compression being related to a rotational position of the metallic part.

14. The position sensor of claim 13 in which the metallic part is located adjacent to the coil in a direction d perpendicular to the axis of the coil.

15. The position sensor of claim 14 in which the metallic part is a disc having an eccentric axis of rotation that is parallel to the axis of the disc and perpendicular to the direction d.

16. The position sensor of claim 9 in which the screen comprises an outer screen adapted to receive the coil and an annular tapered part disposed through the coil, the annular tapered part being rotatable such that the flux compression is related to a rotational position of the annular tapered part relative to the coil.

17. The position sensor of claim 1 further comprising:
a second sensor electromagnetic field generator, the screen being further arranged to confine the second sensor electromagnetic field; and
a second output arranged to provide a second signal which varies in dependence upon an amount of flux compression of the second electromagnetic field resulting from the presence of the screen, the amount of flux compression of the second electromagnetic field being related to a position of the screen in relation to the second sensor electromagnetic field generator.

18. A method of detecting a relative position of an electromagnetic field generator and a screen, the electromagnetic field generator comprising a coil and a capacitive element which together form a resonant circuit, the method comprising:
(a) generating an electromagnetic field using the electromagnetic field generator;
(b) confining the electromagnetic field using the screen such that the screen behaves as an effective flux mirror; and
(c) detecting an amount of flux compression of the electromagnetic field resulting from the presence of the screen by measuring at least one of a resonant frequency and a quality factor of the resonant circuit, the resonant frequency and the quality factor being related to the amount of flux compression of the electromagnetic field resulting from the presence of the screen, and the amount of flux compression being related to a position of the screen in relation to the electromagnetic field generator.

* * * * *